US012649116B2

(12) United States Patent
Lee et al.

(10) Patent No.: US 12,649,116 B2
(45) Date of Patent: Jun. 9, 2026

(54) INTEGRATED DUAL-MODE CHROMATOGRAPHY TO ENRICH EXTRACELLULAR VESICLES FROM PLASMA

(71) Applicant: The General Hospital Corporation, Boston, MA (US)

(72) Inventors: Hakho Lee, Acton, MA (US); Ralph Weissleder, Peabody, MA (US); Jan Van Deun, Wilrijk (BE)

(73) Assignee: The General Hospital Corporation, Boston, MA (US)

( * ) Notice: Subject to any disclaimer, the term of this patent is extended or adjusted under 35 U.S.C. 154(b) by 838 days.

(21) Appl. No.: 17/798,399

(22) PCT Filed: Feb. 16, 2021

(86) PCT No.: PCT/US2021/018225
§ 371 (c)(1),
(2) Date: Aug. 9, 2022

(87) PCT Pub. No.: WO2021/163696
PCT Pub. Date: Aug. 19, 2021

(65) Prior Publication Data
US 2023/0070693 A1     Mar. 9, 2023

Related U.S. Application Data

(60) Provisional application No. 62/976,534, filed on Feb. 14, 2020.

(51) Int. Cl.
B01D 15/18     (2006.01)
B01D 15/34     (2006.01)
(Continued)

(52) U.S. Cl.
CPC ..... B01D 15/1871 (2013.01); B01D 15/1885 (2013.01); B01D 15/34 (2013.01);
(Continued)

(58) Field of Classification Search
None
See application file for complete search history.

(56) References Cited

U.S. PATENT DOCUMENTS

2010/0050749 A1*  3/2010  Yuan ................. B01L 3/502715
                                                435/293.1
2012/0164750 A1*  6/2012  Gjerde ................... G01N 1/405
                                                436/178

(Continued)

FOREIGN PATENT DOCUMENTS

WO     WO 2019/027847     2/2019
WO     WO 2019/133842     7/2019

OTHER PUBLICATIONS

Benedikter, B.J., Bouwman, F.G., Vajen, T et al. Ultrafiltration combined with size exclusion chromatography efficiently isolates extracellular vesicles from cell culture media for compositional and functional studies. Sci Rep 7, 15297 (2017). (Year: 2017).*

(Continued)

*Primary Examiner* — Benjamin L Lebron
*Assistant Examiner* — Eric J McCullough
(74) *Attorney, Agent, or Firm* — Fish & Richardson P.C.

(57) ABSTRACT

The present disclosure provides, in some embodiments, devices, methods, and kits for purifying extracellular vesicles (EVs) using size exclusion chromatography in tandem with cation exchange chromatography, which can be referred to as dual-mode chromatography (DMC).

18 Claims, 26 Drawing Sheets

(51) Int. Cl.

| | |
|---|---|
| *B01D 15/36* | (2006.01) |
| *B01D 21/26* | (2006.01) |
| *B01D 61/14* | (2006.01) |
| *B01D 69/02* | (2006.01) |
| *B01D 71/56* | (2006.01) |
| *G01N 1/40* | (2006.01) |

(52) U.S. Cl.
CPC ......... *B01D 15/362* (2013.01); *B01D 21/262* (2013.01); *B01D 61/145* (2013.01); *B01D 69/02* (2013.01); *B01D 71/56* (2013.01); *G01N 1/405* (2013.01); *B01D 2325/0283* (2022.08); *B01D 2325/04* (2013.01); *B01D 2325/34* (2013.01); *G01N 2001/4011* (2013.01); *G01N 2001/4088* (2013.01)

(56) References Cited

U.S. PATENT DOCUMENTS

| | | |
|---|---|---|
| 2014/0004601 A1 | 1/2014 | Lim |
| 2015/0133636 A1 | 5/2015 | Xenopoulos et al. |

OTHER PUBLICATIONS

Connell-Crowley, L., et al., (2012), Cation exchange chromatography provides effective retrovirus clearance for antibody purification processes. Biotechnol. Bioeng., 109: 157-165. (Year: 2012).*

Balaj et al., "Tumour microvesicles contain retrotransposon elements and amplified oncogene sequences," Nat Commun, Feb. 2011, 2:180, 9 pages.

Böing et al., "Single-step isolation of extracellular vesicles by size-exclusion chromatography," J Extracell. Vesicles, Sep. 2014, 3:23430, 12 pages.

Brownlee et al., "A novel "salting-out" procedure for the isolation of tumor-derived exosomes," J. Immunol. Methods, May 2014, 407:120-6, 14 pages.

Castellanos-Rizaldos et al., "Exosome-Based Detection of EGFR T790M in Plasma from Non-Small Cell Lung Cancer Patients," Clin. Cancer Res., 2018, 24(12):2944-2950.

Caulfield et al., "Direct determination of lipoprotein particle sizes and concentrations by ion mobility analysis," Clin. Chem., Aug. 2008, 54(8):1307-16.

Connell-Crowley et al., "Cation exchange chromatography provides effective retrovirus clearance for antibody purification processes," Biotechnol Bioeng, Jan. 2012, 109(1):157-65.

Coumans et al., "Methodological Guidelines to Study Extracellular Vesicles," Circ. Res., May 2017, 120(10):1632-1648.

EV-TRACK Consortium, "EV-TRACK: transparent reporting and centralizing knowledge in extracellular vesicle research," Nat. Methods, Feb. 2017, 14(3):228-232.

Figueroa et al., "Detection of wild-type EGFR amplification and EGFRvIII mutation in CSF-derived extracellular vesicles of glioblastoma patients," Neuro. Oncol., Oct. 2017, 19(11):1494-1502.

Fraser et al., "Characterization of single microvesicles in plasma from glioblastoma patients," Neuro. Oncol., May 2019, 21(5):606-615.

Graner et al., "Proteomic and immunologic analyses of brain tumor exosomes," FASEB J., May 2009, 23(5):1541-1557, 17 pages.

Heath et al., "Rapid isolation and enrichment of extracellular vesicle preparations using anion exchange chromatography," Scientific Reports, Apr. 2018, 8:5730, 12 pages.

Im et al., "Label-free detection and molecular profiling of exosomes with a nano-plasmonic sensor," Nat. Biotechnol., May 2014, 32(5):490-5, 9 pages.

International Preliminary Report on Patentability in International Appln. No. PCT/US2021/018225, mailed Aug. 25, 2022, 7 pages.

International Search Report and Written Opinion in International Appln. No. PCT/US2021/018225, mailed Jun. 25, 2021, 11 pages.

Invitation to Pay Additional Fees And, Where Applicable, Protest Fee in International Appln. No. PCT/US2021/018225, mailed Apr. 20, 2021, 2 pages.

Jeong et al., "Integrated Magneto-Electrochemical Sensor for Exosome Analysis," ACS Nano, Feb. 2016, 10(2):1802-1809, 23 pages.

Kaiser et al., "'Liquid biopsy' for cancer promises early detection," Science, Jan. 2018, 359(6373):259.

Karimi et al., "Detailed analysis of the plasma extracellular vesicle proteome after separation from lipoproteins," Cell. Mol. Life Sci., Aug. 2018, 75(15):2873-2886.

Lane et al., "Optimizing Size Exclusion Chromatography for Extracellular Vesicle Enrichment and Proteomic Analysis from Clinically Relevant Samples," Proteomics, Apr. 2019, 19(8):e1800156, 21 pages.

Lee et al., "Multiplexed Profiling of Single Extracellular Vesicles," ACS Nano, Jan. 2018, 12(1):494-503, 21 pages.

Liangsupree et al., "Rapid affinity chromatographic isolation method for LDL in human plasma by immobilized chondroitin-6-sulfate and anti-apoB-100 antibody monolithic disks in tandem," Sci Rep, Aug. 2019, 9(1):11235, 10 pages.

Lipponen et al., "Three Different Approaches for the Clarification of the Interactions between Lipoproteins and Chondroitin-6-sulfate," Anal. Chem., 2011, 83:6040-6046.

Liu et al., "Low-cost thermophoretic profiling of extracellular-vesicle surface proteins for the early detection and classification of cancers," Nat. Biomed. Eng., 2019, 3(3):183-193.

McKiernan et al., "A Novel Urine Exosome Gene Expression Assay to Predict High-grade Prostate Cancer at Initial Biopsy," JAMA Oncol, Jul. 2016, 2(7):882-9.

Olsson et al., "Molecular parameters that control the association of low density lipoprotein apo B-100 with chondroitin sulphate," Biochim. Biophys. Acta, Jul. 1991, 1097(1):37-44.

Osteikoetxea et al., "Differential detergent sensitivity of extracellular vesicle subpopulations," Org. Biomol. Chem., Oct. 2015, 13(38):9775-82.

Pantel and Alix-Panabières, "Real-time liquid biopsy in cancer patients: fact or fiction?," Cancer Res., Nov. 2013, 73(21):6384-8.

Shao et al., "Chip-based analysis of exosomal mRNA mediating drug resistance in glioblastoma," Nat. Commun., May 2015, 6:6999, 9 pages.

Shao et al., "New Technologies for Analysis of Extracellular Vesicles," Chem. Rev., Feb. 2018, 118(4):1917-1950, 83 pages.

Shao et al., "Protein typing of circulating microvesicles allows real-time monitoring of glioblastoma therapy," Nat. Med., Dec. 2012, 18(12):1835-1840.

Simonsen, "What Are We Looking At? Extracellular Vesicles, Lipoproteins, or Both?," Circ. Res., Sep. 2017, 121(8):920-922, 7 pages.

Skog et al., "Glioblastoma microvesicles transport RNA and proteins that promote tumour growth and provide diagnostic biomarkers," Nat. Cell Biol., Dec. 2008, 10(12):1470-6, 12 pages.

Sódar et al., "Low-density lipoprotein mimics blood plasma-derived exosomes and microvesicles during isolation and detection," Sci. Rep., Apr. 2016, 6:24316, 12 pages.

Takov et al., "Comparison of small extracellular vesicles isolated from plasma by ultracentrifugation or size-exclusion chromatography: yield, purity and functional potential," J Extracell. Vesicles, 2019, 8(1):1560809, 18 pages.

Valadi et al., "Exosome-mediated transfer of mRNAs and microRNAs is a novel mechanism of genetic exchange between cells," Nat. Cell Biol., Jun. 2007, 9(6):654-9, 17 pages.

Van Deun et al., "Integrated Dual-Mode Chromatography to Enrich Extracellular Vesicles from Plasma," Adv. Biosyst., Dec. 2020, 4(12):e1900310, 6 pages.

Van Deun et al., "The impact of disparate isolation methods for extracellular vesicles on downstream RNA profiling," Extracell. Vesicles, Sep. 2014, 3:24858, 14 pages.

Webber and Clayton, "How pure are your vesicles?," Extracell. Vesicles, Jan. 2013, 2:19861, 6 pages.

Yang et al., "Multi-parametric plasma EV profiling facilitates diagnosis of pancreatic malignancy," Sci. Transl. Med., May 2017, 9(391):eaal3226, 23 pages.

(56) References Cited

OTHER PUBLICATIONS

Yokoyama et al., "Specific sorbent of apolipoprotein B-containing lipoproteins for plasmapheresis. Characterization and experimental use in hypercholesterolemic rabbits," Arteriosclerosis, May 1984, 4:276-282.

Yoshioka et al., "Ultra-sensitive liquid biopsy of circulating extracellular vesicles using ExoScreen," Nat. Commun., Apr. 2014, 5:3591, 8 pages.

Zhang et al., "Morphology and structure of lipoproteins revealed by an optimized negative-staining protocol of electron microscopy," J. Lipid Res., 2010, 52(1):175-184.

Zhang et al., "Ultrasensitive detection of circulating exosomes with a 3D-nanopatterned microfluidic chip," Nat. Biomed. Eng., Jun. 2019, 3(6):438-451.

* cited by examiner

INTEGRATED DUAL-MODE CHROMATOGRAPHY TO ENRICH EXTRACELLULAR VESICLES FROM PLASMA

CLAIM OF PRIORITY

This application is a U.S. National Phase Application under 35 U.S.C. § 371 of International Patent Application No. PCT/US2021/018225, filed on Feb. 16, 2021, which claims the benefit of U.S. Provisional Patent Application No. 62/976,534, filed on Feb. 14, 2020, which is incorporated by reference herein in its entirety.

FIELD OF THE INVENTION

The subject matter disclosed herein generally relates to devices and methods for purifying extracellular vesicles (EVs).

BACKGROUND OF THE INVENTION

Purifying extracellular vesicles (EVs) from complex biological fluids is a critical step in analyzing EVs molecularly. Plasma lipoprotein particles (LPPs) are a significant confounding factor as they outnumber EVs >$10^4$-fold. Given their overlap in size, LPPs cannot be completely removed using standard size-exclusion chromatography. Density-based separation of LPPs can be applied, but is impractical for routine use in clinical research and practice. It is therefore of interest to develop new devices and methods for purifying extracellular vesicles, particularly devices and methods that are compatible for use in clinical research and practice.

SUMMARY OF THE INVENTION

The present disclosure is based, at least in part, on the development of devices and methods for purifying extracellular vesicles (EVs) that provide several improvements over conventional purification approaches. Such improvements include, but are not limited to, improved enrichment of extracellular vesicles (EVs) and improved depletion of contaminants such as lipoprotein particles (LPPs) from samples (e.g., plasma samples).

Accordingly, aspects of the present disclosure provide methods for purifying extracellular vesicles (EVs) from a sample comprising contacting a sample comprising EVs with a size exclusion resin for a time and under conditions sufficient to separate high density lipoprotein (HDL) from EVs, contacting the sample with a cation exchange resin for a time and under conditions sufficient to bind lipoprotein particles (LLPs), and collecting flow-through comprising EVs.

In some embodiments, the sample is contacted with the size exclusion resin and the cation exchange resin at the same time. In some embodiments, the sample is contacted with the size exclusion resin prior to contacting the cation exchange resin. In some embodiments, the sample is contacted with the size exclusion resin after contacting the cation exchange resin.

In some embodiments, the size exclusion resin and the cation exchange resin are disposed in different columns. In some embodiments, the size exclusion resin and the cation exchange resin are disposed in the same column.

In some embodiments, the size exclusion resin contacts the cation exchange resin. In some embodiments, the size exclusion resin has a pore size of 40 to 70 nm. In some embodiments, the size exclusion resin is Sepharose CL-4B.

In some embodiments, the cation exchange resin comprises sulfoisobutyl ligands. In some embodiments, the cation exchange resin is Fractogel EMD $SO_3^-$.

In some embodiments, the column further comprises a membrane disposed inside the column. In some embodiments, the membrane is a nylon membrane. In some embodiments, the membrane has a pore size of 2 to 50 μm. In some embodiments, the membrane has a thickness of 0.1 to 10 mm. In some embodiments, the column is a disposable column.

In some embodiments, methods further comprise contacting a buffer with the size exclusion resin, the cation exchange resin, or both.

In some embodiments, the sample is plasma, serum, or cell culture supernatant. In some embodiments, the volume of the sample is between 0.1 to 5 mL.

In some embodiments, methods further comprise centrifuging the sample prior to contacting the sample with the size exclusion resin.

In some embodiments, methods further comprise concentrating extracellular vesicles (EVs) in the flow-through using ultrafiltration. In some embodiments, a membrane is used during ultrafiltration. In some embodiments, the membrane comprises a molecular weight cut-off of 10 to 100 kDa.

Aspects of the present disclosure provide devices for purifying extracellular vesicles (EVs) comprising a column having inlet and outlet openings, and a size exclusion resin and a cation exchange resin disposed in the column, wherein the cation exchange resin is downstream of the size exclusion resin.

In some embodiments, the size exclusion resin contacts the cation exchange resin. In some embodiments, the volume of the size exclusion resin is between 2 to 50 mL. In some embodiments, the cation exchange resin is between 0.4 to 10 mL. In some embodiments, the size exclusion resin has a pore size of 40 to 70 nm. In some embodiments, the size exclusion resin is Sepharose CL-4B. In some embodiments, the cation exchange resin comprises sulfoisobutyl ligands. In some embodiments, the cation exchange resin is Fractogel EMD $SO_3^-$.

In some embodiments, devices further comprise a membrane disposed inside the column. In some embodiments, the membrane is disposed between the size exclusion resin and the cation exchange resin. In some embodiments, the membrane is a nylon membrane. In some embodiments, the membrane has a pore size of 2 to 50 μm. In some embodiments, the membrane has a thickness of 0.1 to 10 mm.

In some embodiments, the column has a diameter of 4 to 30 mm. In some embodiments, the column is a disposable column.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

BRIEF DESCRIPTION OF THE DRAWINGS

Various aspects and embodiments will be described with reference to the following figures. The figures are not necessarily drawn to scale.

FIG. 2A: a schematic depiction of typical concentrations of lipoprotein particles (LPPs) and extracellular vesicles (EVs) in human plasma. LPP numbers are considerably higher ($>10^4$) than EV numbers and also fluctuate during the day. HDL, high-density lipoprotein; LDL, low-density lipoprotein; VLDL, very low-density lipoprotein. FIG. 2B: a schematic representation of the most common particle species found in plasma, discriminated by size and surface charge. Note that EVs overlap in size with (V)LDL, but have opposite surface charge. Gray dotted line indicates a commonly used cut-off for size-exclusion chromatography (SEC) that separates EVs from other particles. FIG. 2C: a schematic depiction of a dual-mode chromatography (DMC) column. The device has two separation layers in tandem: size exclusion (top) and cation exchange (bottom). The top layer is used to filter out small analytes, including soluble proteins and HDL particles. Filtrates then enter the cation exchange layer where positively-charged particles (e.g., LDL, VLDL) are captured. The resulting sample is depleted from LPPs and enriched in EVs.

FIG. 3A: EV recovery was estimated using samples with a known number of cell-line derived EVs in PBS (input). Equal amount of samples were passed through a SEC or DMC column, and particle numbers after preparation were measured via nanoparticle tracking analysis (NTA). Recovery ratios were 78% (SEC) and 34% (DMC). Data from technical triplicates are displayed as mean±s.d. FIG. 3B: DMC and SEC columns were used to process mock clinical samples which were human plasma spiked with cell-line derived EVs. Most ApoB1 proteins were removed by DMC. Data from technical duplicates are displayed as mean±s.d. FIG. 3C: the same amount of plasma and EV sample proteins from FIG. 3B were analyzed. ApoA1 levels were comparable between SEC and DMC. CD63 was significantly enriched in DMC samples. FIG. 3D: capacity for LPP removal by DMC and SEC were compared. ApoA1 (HDL) and ApoB100 (VLDL and LDL) contents were measured before and after filtration of human plasma (0.5 mL). Both DMC and SEC showed a similar efficiency (~97%) in ApoA1 depletion. For ApoB100 removal, DMC (efficiency: 0.4%) significantly outperformed SEC (25%). Data from technical duplicates are displayed as mean±s.d for ApoB100. ApoA1 quantification was based on band intensity from Western blotting. FIG. 3E: relative mass-ratios of ApoA1, ApoB100, and CD63 were estimated in SEC and DMC filtrates. (V)LDL was the major vesicle population in the SEC filtrate, whereas EVs were the dominant component in the DMC-prepared sample. FIG. 3F: transmission electron micrographs of SEC- and DMC-prepared human plasma. EVs (arrowheads) were negatively stained; LPPs appeared white. Note LPP reduction and EV enrichment in the DMC sample. Close-up images are provided in FIG. 6.

FIGS. 4A-4B: single particle imaging. SEC and DMC samples were labeled with the general lipid dye (left panel) and fluorescent CD63 antibodies (right panel). The SEC sample contained a large number of lipid particles per field-of-view (FOV, 77×65 $\mu m^2$), but few of them were CD63-positive (FIG. 4A). The DMC sample, in contrast, was enriched with CD63-positive lipid particles (FIG. 4B). The graphs show particle counts (mean±s.d.) from four FOVs. FIG. 4C: integrated magneto-electrochemical exosome (iMEX) EV protein assay. EVs are captured on magnetic beads based on EV-specific surface markers (CD63, CD81, CD9) and further labeled with probe antibodies to detect target protein markers. Probe antibodies, conjugated with oxidizing enzymes, generate electrical currents through electrochemical reaction. FIG. 4D: human plasma was spiked with EVs from Gli36 EFGRvIII mutation. Following SEC or DMC preparation, samples were assessed for CD63 and EGFRvIII expression via iMEX. The DMC sample showed a slightly lower CD63 signal than SEC, reflecting lower EV recovery. EGFRvIII signal, however, was higher in the DMC sample, presumably due to reduced interference from biological background. The data are from technical duplicates and displayed as mean±s.d.

FIG. 5A: cation exchange columns, made of various resins (2 mL for each type), were compared for their capacity for (V)LDL capture. The input standard was prepared by filtering human plasma via SEC. Each exchange column was loaded with 2 mL of the standard sample and the amount of ApoB100 was quantified through ELISA before and after filtration. Fractogel-based filter had the best ApoB100 removal rate (~98%). FIG. 5B: particle numbers after filtration, measured via nanoparticle tracking analysis, showed a similar trend as in ELISA. FIG. 5C: two columns packed with different volumes of Fractogel were tested. The overall improvement in the removal yield was similar. All data are from technical duplicates and displayed as mean±s.d.

FIG. 7A: equal protein amounts (18 μg) were loaded per sample. Both SEC and DMC depleted soluble proteins from the initial plasma, as evidenced by the decrease of the serum albumin and IgG heavy chain bands (66 kDa and 55 kDa, respectively). DMC preparation resulted in a more specifically enriched sample as evidenced by a distinct pattern of discrete bands compared to SEC. FIG. 7B: cholesterol concentrations were lower in DMC-prepared EV samples. FIG. 7C: side-by-side comparison of the appearance of an SEC- and DMC-prepared EV sample.

FIG. 8A: SEC and DMC EV fractions of plasma samples were analyzed for total particle counts (NTA) and ApoB100 amounts (ELISA). Note the good linear correlation (R2=0.95) between these two variables. The slope of the line is non-zero with statistical significance (p=0.02; two-sided t-test). The data is displayed as mean±s.d. from technical duplicates. FIG. 8B: SEC or DMC-processed EV-spiked plasma samples were analyzed. Equal number of particles (by NTA) were loaded for Western blotting. CD63 staining was stronger in the DMC sample than in the SEC sample.

Figure 1:
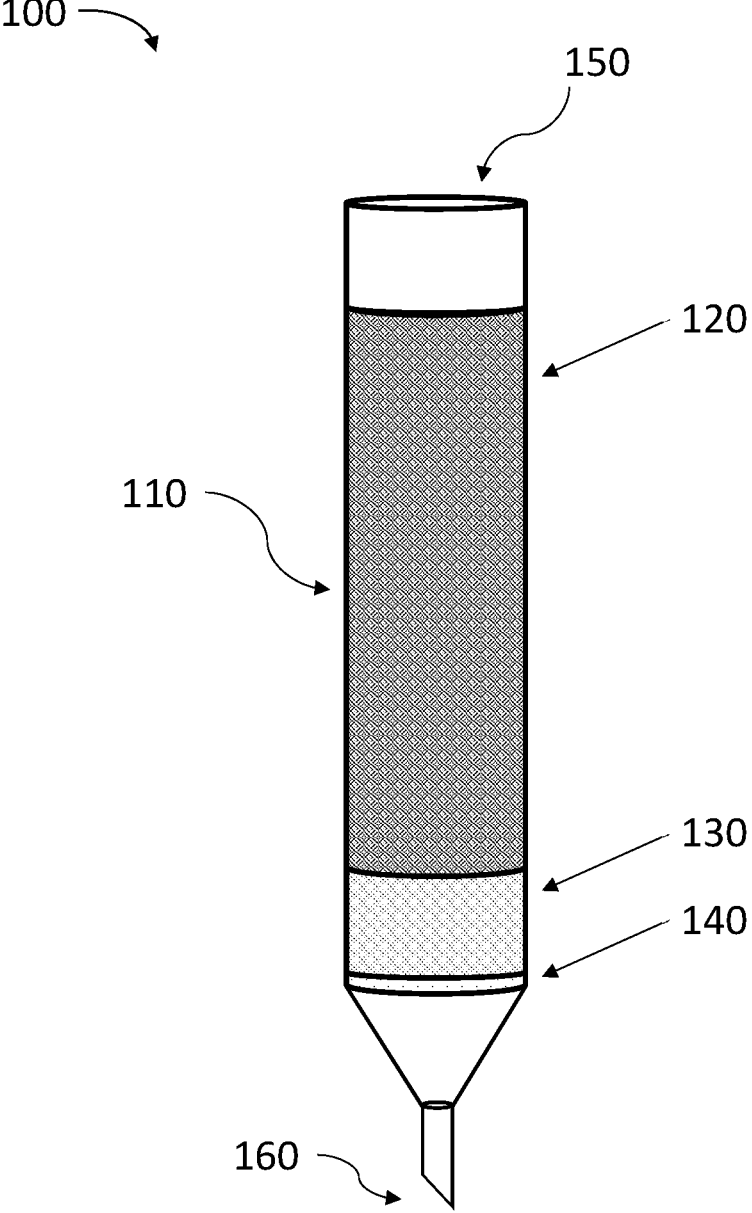
FIG. 1 is a schematic depiction of an example of a dual-mode chromatography (DMC) device 100 for purifying extracellular vesicles (EVs). The DMC device 100 comprises a column 110, a size exclusion resin 120, a cation exchange resin 130, and optionally a membrane 140, in accordance with some embodiments of the technology described herein. The column 110 has an inlet opening 150 for adding sample and buffer, and an outlet opening 160 for collecting flow-through comprising EVs.

The details of one or more embodiments of the invention are set forth in the description below. Other features or advantages of the present invention will be apparent from the following drawings and detailed description of several embodiments, and also from the appended claims.

DETAILED DESCRIPTION

The present disclosure is based, at least in part, on the development of dual-mode chromatography (DMC) for purifying extracellular vesicles (EVs) that provide several improvements over conventional approaches. Such improvements include:

(a) Improved enrichment of extracellular vesicles (EVs) from samples (e.g., plasma samples) resulting at least in part from improved depletion of lipoprotein particles (LPPs) achieved using devices and methods described herein.

(b) Improved depletion of lipoprotein particles (LPPs) from samples (e.g., plasma samples) resulting at least in part from efficient removal of very low-density lipoprotein (V)LDL achieved using devices and methods described herein.

(c) Improved performance of extracellular vesicles (EVs) in downstream applications resulting at least in part from removal of abundant LLPs using devices and methods described herein. For example, improved identification in EV imaging analysis and improved accuracy in EV protein analysis was achieved using EVs purified as described herein.

(d) Reduced loss of extracellular vesicles (EVs) from samples resulting from orthogonal separations involving one-time sample loading.

(e) Rapid and simplified extracellular vesicle (EV) purification that can be achieved in as little as 15 minutes per sample, and without use of a centrifuge.

Accordingly, provided herein are devices and methods for performing dual-mode chromatography (DMC) that involves size exclusion chromatography in tandem with cation exchange chromatography to obtain a population of extracellular vesicles (EVs) that is substantially depleted of lipoprotein particles (LLPs).

Extracellular vesicles (EVs) are important disease biomarkers that are ubiquitously present in bodily fluids and carry molecular cargo (e.g., transmembrane and intracellular proteins, mRNA, DNA, and microRNA) from their respective parental cells. EVs thus can serve as a blood-based analytical method to obtain and monitor molecular traits of various diseases, thereby promoting better-informed clinical decisions.

Indeed, EVs were found superior to conventional protein markers for tumor detection (Shao et al., *Nat. Commun.* 2015, 6, 6999; Yang et al., *Sci. Transl. Med.* 2017, 9, eaal3226; Yoshioka et al., *Nat. Commun.* 2014, 5, 3591; Zhang et al., *Nat. Biomed. Eng.* 2019, 3, 438; Liu et al., *Nat. Biomed. Eng.* 2019, 3, 183; Im et al., *Nat. Biotechnol.* 2014, 32, 490; Jeong et al., *ACS Nano* 2016, 10, 1802; and Shao et al., *Nat. Med.* 2012, 18, 1835). Key mutations (e.g., EGFRvIII, IDH1R132H, $EGFR^{T790M}$) have also been detected in EVs (Shao et al., *Nat. Med.* 2012, 18, 1835; Figueroa et al., Neuro. Oncol. 2017, 19, 1494; and Castellanos-Rizaldos et al., *Clin. Cancer Res.* 2018, 24, 2944).

Essential to diagnostic EV analysis is the ability to perform a given molecular test in true EV fractions, rather than in contaminated mixtures. In other words, EVs exist in complex heterogeneous matrices and retrieving pure EV populations is a pivotal first assay step.

Among various EV isolation strategies, size-exclusion chromatography (SEC) is increasingly adopted as a preferable isolation method for clinical samples, considering its low cost, much faster turn-around time compared to ultracentrifugation, and ease-of-operation (Shao et al., *Chem. Rev.* 2018, 118, 1917; and Lane et al., *Proteomics* 2019, 19, e1800156). SEC separates analytes based on their differential retention time in porous gels. When applied to plasma or serum, SEC produces well-defined vesicle fractions with most soluble proteins removed (Boing et al., *J. Extracell. Vesicles* 2014, 3, 23430).

The current approaches, however, often fail to differentiate EVs from certain types of lipoprotein particles (LPPs), predominantly (very) low-density lipoproteins (V)LDL, due to size overlap (Karimi et al., *Cell. Mol. Life Sci.* 2018, 75, 2873; Sódar et al., *Sci. Rep.* 2016, 6, 24316; and Takov et al., *J. Extracell. Vesicles* 2019, 8, 1560809). With LPPs (~$10^{15}$ particles/mL) (Caulfield et al., *Clin. Chem.* 2008, 54, 1307) significantly outnumbering EVs (~$10^7$-$10^9$ particles/mL in healthy individuals) (Coumans et al., *Circ. Res.* 2017, 120, 1632), SEC-prepared samples are susceptible to artifacts, including overestimation of actual EV counts, steric hindrance in immunoassays, and increased biological noise. This is especially important in the discovery phase of EV protein biomarkers, as the abundance of LPPs can confound the search for less-abundant EV-associated proteins. Density-gradient ultracentrifugation can be incorporated before or after SEC to separate EVs from LPPs but the combined process negates SEC's practical advantages.

Accordingly, described herein are substantially improved chromatography methods for rapid EV isolation from plasma samples. The chromatography methods described herein exploit the contrast in surface charge properties between EVs, which are negatively charged, and ApoB100-containing LPPs, which carry an abundance of positive charges. Previous methods focused on size and/or density to discriminate EVs and LPPs, however, the methods and devices described herein focus on charge discrepancies between EVs and LPPs to achieve better particle separation. Thus, described herein are methods, termed dual-mode chromatography (DMC), that involve ion exchange chromatography in tandem with size-exclusion chromatography to obtain an LPP-depleted EV population. Such methods allowed removal of the majority of plasma LPPs, >97% of high-density lipoprotein/HDL and >99% of (V)LDL, while maintaining a relatively high EV isolation yield comparable to that of SEC. Also described herein are layered monolithic devices, termed DMC devices, for performing orthogonal separations through a one-time sample loading. This one-time loading approach is particularly important compared to sequential separation strategies as it minimizes loss of rare EV fractions. DMC operation was simple, fast (15 minutes per sample) and essentially equipment-free. Furthermore, DMC-prepared samples lead to better analytical outcomes in single vesicle imaging and EV protein analyses.

I. Components for Use in Dual-Mode Chromatography (DMC)

The dual-mode chromatography (DMC) methods and devices disclosed herein involve (a) a column, (b) a size exclusion resin, (c) a cation exchange resin, and optionally (d) a membrane.

(a) Columns

The term "column" refers to any enclosure or housing adapted for use in a chromatography process such as dual-mode chromatography that is suitable for retaining all or part of a chromatography resin and enabling sample and/or buffer to contact the chromatography resin. Typically, such columns are in the form of conduits, tubes, or other structures having a relatively large ratio of flow length to flow cross section. In some examples, the column defines a cylindrically shaped hollow interior with a volume that can be characterized by its internal radius and/or flow length.

The column body is a tube having two open ends connected by an open channel, which can also be referred to as a through passageway. The tube can be in any shape, including, but not limited to, cylindrical or frustoconical, and of any dimensions consistent with the function of the column as described herein. In some embodiments, the column body takes the form of a syringe, a pipette tip, or similar tubular bodies. In some embodiments, where the column body is a syringe, the syringe is modified to contain the chromatography resin. The end of the column body wherein the bed of chromatography resin is placed can take any of a number of geometries, e.g., it can be tapered or cylindrical. In some case a cylindrical channel of relatively constant radius can be preferable to a tapered tip, for a variety of reason, e.g., solution flows through the bed at a uniform rate, rather than varying as a function of a variable channel diameter. In some embodiments, one of the open ends of the column is adapted for a particular use, for example, the outlet opening of the column is adapted for attachment to a collection tube, either directly or indirectly for collecting flow-through comprising extracellular vesicles (EVs) in the collection tube.

The column can be composed of any material that is sufficiently non-porous that it can retain chromatography resin and that is compatible with substances used in devices and methods described herein. For example, a column or a portion thereof should be a material that does not substantially react with substances it will contact during use of the column, e.g., the sample solutions and the chromatography resin. A wide range of materials suitable for use in a column are known in the art. Various plastics can be used as column materials, but other materials such as glass, ceramics, or metals are suitable for use in devices and methods described herein. Examples of materials include, but are not limited to, polysulfone, polypropylene, polyethylene, polyethylene terephthalate, polyethersulfone, polytetrafluoroethylene, cellulose, cellulose acetate, cellulose acetate butyrate, acrylonitrile PVC copolymer, polystyrene, polystyrene/acrylonitrile copolymer, polyvinylidene fluoride, polytetrafluoroethylene (PTFE) (e.g., TEFLON®) and similar materials, glass, polyether ether ketone (PEEK), metal, silica, and combinations thereof (b) Size Exclusion Resin The term "size exclusion resin" refers to a stationary phase that separate molecules in a mobile phase passed over or through the stationary phase based on their size. Separation occurs when molecules of different sizes are included or excluded from pores within the stationary phase. Small molecules diffuse into the pores and their flow through the column is inhibited according to their size, while large molecules do not enter the pores and are eluted in the void volume of the column. As a result, molecules are separated based on their size as they pass through the column and are eluted in order of decreasing size.

In dual-mode chromatography (DMC), the size exclusion resin is used to separate larger high density lipoprotein (HDL) from smaller extracellular vesicles (EVs).

Any suitable size exclusion resin can be used in dual-mode chromatography (DMC). In some examples, the size exclusion resin is a commercially available size exclusion resin. Commercially available size exclusion resin include, but are not limited to, Superdex (e.g., Superdex 30, Superdex 75, Superdex 200), Sephacryl (e.g., Sephacryl S-100, Sephacryl S-100, Sephacryl S-100, Sephacryl S-400, Sephacryl S-500), Sephadex (e.g., Sephadex G-25, Sephadex G-50, Sephadex G-100), Superose (e.g., Superose 6, Superose 12), Sepharose (e.g., Sepharose 2B, Sepharose CL-2B, Sepharose 4B, Sepharose 4 Fast Flow, Sepharose CL-4B, Sepharose 6B, Sepharose 6 Fast Flow, Sepharose CL-6B), Fractogel (e.g., Fractogel EMD BioSEC), Toyopearl (e.g., Toyopearl HW-40, Toyopearl HW-50, Toyopearl HW-55, Toyopearl HW-65, Toyopearl HW-75), or Bio-Gel (e.g., Bio-Gel P-2, Bio-Gel P-4, Bio-Gel P-6, Bio-Gel P-10, Bio-Gel P-30, Bio-Gel P-60, Bio-Gel P-100).

A size exclusion resin can have any pore size suitable to separate smaller high density lipoprotein (HDL) from larger extracellular vesicles (EVs). For example, the size exclusion resin has a pore size of 5 to 100 nm. In some examples, the size exclusion resin has a pore size of 10 to 90 nm, 20 to 80 nm, 30 to 70 nm, or 40 to 60 nm. In some examples, the size exclusion resin has a pore size of 40 to 70 nm.

(c) Cation Exchange Resin

The term "cation exchange resin" refers to a stationary phase which is negatively charged, and which thus has free cations for exchange with cations in a mobile phase passed over or through the stationary phase. In dual-mode chromatography (DMC), the cation exchange resin binds positively charged molecules such as ApoB100-containing plasma lipoprotein particles (LLPs) in the sample while negatively charged extracellular vesicles (EVs) "flow through" the cation exchange resin.

Any suitable cation exchange resin can be used in dual-mode chromatography (DMC). A cation exchange resin can include any negatively charged ligand (e.g., sulfoisobutyl ligands, sulfonate ligands, sulfoethyl ligands, sulfopropyl ligands, and carboxymethyl ligands) attached to a solid phase that is suitable to form the cation exchange resin. In some examples, the cation exchange resin is a commercially available cation exchange resin. Commercially available cation exchange resins include, but are not limited to, those having a sulfoisobutyl based group (e.g., Fractogel EMD SO$_3$); a sulfonate based group (e.g., SP Sepharose Fast Flow, Capto S, Macro-Prep High S); a sulfoethyl based group (e.g., Fractogel SE); a sulfopropyl based group (e.g., TSK- Gel SP SPW, Poros HS-20, Poros HS-50); and a carboxym-ethyl based group (e.g., CM Sepharose Fast Flow, Macro-Prep CM, Toyopearl CM-650S, Toyopearl CM-650M, Toyopearl CM-650C).

(d) Membranes

The term "membrane" refers to a porous material that allows the passage of some substances, but not others. In some examples, the membrane retains the size exclusion resin and the cation exchange resin in the device, and allows passage of sample and buffer through the device. Alternatively, or in addition to, the membrane retains some molecules on one side of the membrane, and allows other molecules to pass through the membrane.

Any membrane suitable for such purposes can be used in dual-mode chromatography (DMC) methods and devices described herein. Non-limiting examples of suitable membranes include a nylon membrane, a nitrocellulose membrane, a cellulose membrane, a polyvinylidine fluoride membrane, a polycarbonate membrane, a polypropylene membrane, a polyethylene membrane, a polytetrafluoroeth-ylene membrane, a poly-paraphenylene terephthalamide membrane, a glass membrane, a metal membrane, or a combination thereof (e) Frits The term "frit" refers to porous material for holding the chromatography resin in place in a device, for example, in a column, a syringe, a pipette tip, or other chromatography chamber of the device. For example, when the device includes a column, a top frit and a bottom frit can be positioned in the column. The top frit allows liquid to enter and pass into the through the column under gravity flow. In some examples, the top frit is absent and chromatography resin positioned above the bottom frit allows liquid to enter and pass through the column under gravity flow.

Any frit suitable for such purposes can be used in dual-mode chromatography (DMC) methods and devices described herein. Frits can take a variety of forms, and can be constructed from a variety of materials, e.g., glass, ceramic, metal, fiber, polysulfone, polypropylene, polyeth-ylene, polyethylene terephthalate, polyethersulfone, polytet-rafluoroethylene, cellulose, cellulose acetate, cellulose acetate butyrate, acrylonitrile PVC copolymer, polystyrene, polystyrene/acrylonitrile copolymer, polyvinylidene fluo-ride, polytetrafluoroethylene (PTFE) (e.g., TEFLON®) and similar materials, ceramic, glass, polyether ether ketone (PEEK), metal, silica, and combinations thereof. In some examples, the frit is a porous or sintered material. In some examples, the frit is a thin, low pore volume fabric, e.g., a membrane.

The pore openings of the frit should be sufficiently large so as to minimize resistance to flow, but not so large that the frit is unable to adequately contain the chromatography resin in the device. In some examples, the frit has a pore size of 5 to 100 μm. In some examples, the frit has a pore size of 10 to 100 μm, 20 to 100 μm, 30 to 100 μm, 40 to 100 μm, 50 to 100 μm, 60 to 100 μm, 70 to 100 μm, 80 to 100 μm, 90 to 100 μm, 5 to 90 μm, 5 to 80 μm, 5 to 70 μm, 5 to 60 μm, 5 to 50 μm, 5 to 40 μm, 5 to 30 μm, 5 to 20 μm, or 5 to 10 μm.

II. Dual-Mode Chromatography (DMC) Devices

Aspects of the present disclosure provide dual-mode chromatography (DMC) devices for purifying EVs in a sample comprising such (e.g., a plasma sample). FIG. 1 illustrates an example of a dual-mode chromatography (DMC) device described herein.

As shown in FIG. 1, the DMC device 100, in some embodiments, comprises a column 110, a size exclusion resin 120, a cation exchange resin 130, and a membrane 140. The column 110 has an inlet opening 150 for adding sample and buffer, and an outlet opening 160 for collecting flow-through comprising EVs.

A DMC device can comprise any column in which the cation exchange resin can be packed, loaded, or disposed. The column can be any suitable size, shape, and material for purifying EVs. Non-limiting examples of a column include a plastic column, a glass column, a metal column, or a combination thereof. The column can be disposable or the column can be reusable.

Specific characteristics and dimensions of the column can be modified as necessary to achieve desired results (e.g., purification of EVs). In some examples, the column size can be 20 to 50 mm in diameter and 50 to 250 mm in length or the column size can be 4.5 mm in diameter and 12 to 25 mm in length. In some examples, the column can have a diameter of 4 to 30 mm and a surface area of 0.2 to 0.9 in$^2$. In some embodiments, the column has a diameter of 5 to 30 mm, 10 to 30 mm, 15 to 30 mm, 20 to 30 mm, 25 to 30 mm, 4 to 25 mm, 4 to 20 mm, 4 to 15 mm, 4 to 10 mm, 4 to 5 mm. In some embodiments, the column has a surface area of 0.3 to 0.9 in$^2$, 0.4 to 0.9 in$^2$, 0.5 to 0.9 in$^2$, 0.6 to 0.9 in$^2$, 0.7 to 0.9 in$^2$, 0.8 to 0.9 in$^2$, 0.2 to 0.8 in$^2$, 0.2 to 0.7 in$^2$, 0.2 to 0.6 in$^2$, 0.2 to 0.5 in$^2$, 0.2 to 0.4 in$^2$, or 0.2 to 0.3 in$^2$.

It should be understood that the device is not limited to a column. For example, the device can equally include a syringe or a multi-well plate with a packed bed of size exclusion resin and cation exchange resin.

A DMC device can contain any suitable size exclusion resin and any suitable cation exchange resin (e.g., those described herein). In some examples, the size exclusion resin is Sepharose CL-4B. In some examples, the cation exchange resin is Fractogel EMD SO$_3^-$.

In some examples, the DMC devices are configured such that the cation exchange resin is downstream of the size exclusion resin. For example, as shown in FIG. 1, the size exclusion resin 120 sits on top (in this embodiment) of the cation exchange resin 130 in the column 110 of the DMC device 100. In such instances, the size exclusion resin is in direct contact with the cation exchange resin. In other examples, the size exclusion resin and the cation exchange resin can be separated, for example, by a barrier such as a filter or a porous or semi-porous membrane.

The DMC devices can be configured such that the size exclusion resin and cation exchange resin are in fluid communication, which allows the sample to undergo tandem chromatography steps as it passes through the device. As the sample travels through the size exclusion resin, small ana-lytes such as soluble proteins and HDL particles are filtered out. The sample then travels through the cation exchange resin where positively-charged particles are captured. As a result, the sample exiting the device is depleted of LPPs and enriched in EVs.

In some examples, the DMC devices are configured such that the size exclusion resin is downstream of the cation exchange resin. In such instances, the sample travels through the cation exchange resin where positively-charged particles are captured, and then the sample travels through the size exclusion resin where small analytes such as soluble pro-teins and HDL particles are filtered out. As a result, the sample exiting the device is depleted of LPPs and enriched in EVs.

In some examples, the DMC devices are configured such that the size exclusion resin and the cation exchange resin are mixed. In such instances, the sample contacts the size exclusion resin and the cation exchange resin at the same time such that small analytes are filtered out of the sample by the size exclusion resin at the same time that positively-charged particles are captured from the sample by the cation exchange resin. As a result, the sample exiting the device is depleted of LPPs and enriched in EVs.

A DMC device can contain any suitable amount of size exclusion resin and any suitable amount of cation exchange resin for purifying EVs. In some embodiments, the volume of the size exclusion resin is between 1 to 250 mL, e.g., between 50 to 200 mL, or between 25 to 125 mL. In some embodiments, the volume of the size exclusion resin is between 5 to 50 mL, between 10 to 50 mL, between 15 to 50 mL, between 20 to 50 mL, between 25 to 50 mL, between 30 to 50 mL, between 35 to 50 mL, between 40 to 50 mL, between 45 to 50 mL, between 2 to 45 mL, between 2 to 40 mL, between 2 to 35 mL, between 2 to 30 mL, between 2 to 25 mL, between 2 to 20 mL, between 2 to 15 mL, between 2 to 10 mL, or between 2 to 5 mL. In some embodiments, the volume of the cation exchange resin is between 1 to 250 mL, e.g., between 50 to 200 mL, or between 25 to 125 mL. In some embodiments, the volume of the cation exchange resin is between 0.5 to 10 mL, between 1 to 10 mL, between 2.5 to 10 mL, between 5 to 10 mL, between 7.5 to 10 mL, between 0.4 to 7.5 mL, between 0.4 to 5 mL, between 0.4 to 2.5 mL, or between 0.4 to 1 mL.

In some embodiments, the amount of size exclusion resin is about 5 times that of the cation exchange resin (e.g., the size exclusion resin is 10 mL and the cation exchange resin is 2 mL). In some embodiments, the size exclusion resin is between 2 to 50 mL and the cation exchange resin is between 0.4 to 10 mL.

A DMC device can include any membrane suitable for retaining the chromatography resin in the device and allowing passage of liquid. In some examples, as shown in FIG. 1, the DMC device 100 includes a membrane 140 that retains the size exclusion resin 120 and the cation exchange resin 130 in the column 110, and that allows passage of sample and buffer through the column 110. Alternatively, or in addition to, the DMC device can include a membrane positioned between the size exclusion resin and the cation exchange resin.

A membrane for use in a DMC device described herein can be any suitable size, shape, and material for purifying EVs. Examples of suitable materials include, but are not limited to, nylon, nitrocellulose, cellulose, polyvinylidine fluoride, polycarbonate, polypropylene, polyethylene, poly-tetrafluoroethylene, poly-paraphenylene terephthalamide, glass, and metal.

Specific characteristics and dimensions of the membrane can be modified as necessary to achieve desired results (e.g., purification of EVs). For example, the membrane has a pore size of 2 to 50 μm and a thickness of 0.1 to 10 mm. In some embodiments, the membrane has a pore size of 5 to 50 μm, 10 to 50 μm, 15 to 50 μm, 20 to 50 μm, 25 to 50 μm, 30 to 50 μm, 35 to 50 μm, 40 to 50 μm, 45 to 50 μm, 2 to 45 μm, 2 to 40 μm, 2 to 35 μm, 2 to 30 μm, 2 to 25 μm, 2 to 20 μm, 2 to 15 μm, 2 to 10 μm, or 2 to 5 μm. In some embodiments, the membrane has a thickness of 0.25 to 10 mm, 0.5 to 10 mm, 0.75 to 10 mm, 1 to 10 mm, 2.5 to 10 mm, 5 to 10 mm, 7.5 to 10 mm, 0.1 to 7.5 mm, 0.1 to 5 mm, 0.1 to 2.5 mm, 0.1 to 1 mm, 0.1 to 0.75 mm, 0.1 to 0.5 mm, or 0.1 to 0.25 mm.

A DMC device can include any frit suitable for retaining the chromatography resin in the device and allowing passage of liquid. A frit for use in a DMC device described herein can be any suitable size, shape, and material for purifying EVs. Examples of suitable materials include, but are not limited to, glass, ceramic, metal, fiber, polysulfone, polypropylene, polyethylene, polyethylene terephthalate, polyethersulfone, polytetrafluoroethylene, cellulose, cellulose acetate, cellulose acetate butyrate, acrylonitrile PVC copolymer, polystyrene, polystyrene/acrylonitrile copolymer, polyvinylidene fluoride, polytetrafluoroethylene (PTFE) (e.g., TEFLON®) and similar materials, ceramic, glass, polyether ether ketone (PEEK), metal, silica, and combinations thereof Specific characteristics and dimensions of the frit can be modified as necessary to achieve desired results (e.g., purification of EVs). For example, the frit can have a pore size of 5 to 100 μm, 25 to 100 μm, 50 to 100 μm, 75 to 100 μm, 5 to 75 μm, 5 to 50 μm, or 5 to 25 μm.

The DMC devices described herein can include one or more additional components. For example, the device can include a cap for capping and preventing solution from passing through the column.

It should be appreciated that various embodiments of the device, including multiple components of the device (e.g., the column, the size exclusion resin, the cation exchange resin, the membrane) as described herein, can be formed with suitable materials, e.g., with any suitable column, with any suitable size exclusion resin, with any suitable cation exchange resin, with any suitable membrane, and with any suitable combination thereof.

III. Purification of Extracellular Vesicles (EVs)

Also provided herein are dual-mode chromatography (DMC) methods for purifying extracellular vesicles (EVs) in a sample comprising such. Methods described herein involve the use of a size exclusion resin and a cation exchange resin, each of which is described herein.

To perform methods described herein, a sample comprising EVs is brought in contact with the size exclusion resin and the cation exchange resin under conditions sufficient for the size exclusion resin to filter out small analytes (e.g., soluble proteins and high density lipoprotein (HDL)) and for the cation exchange resin to capture positively-charged particles (e.g., low-density lipoprotein LDL and very low-density lipoprotein (VLDL)). After contact with the size exclusion resin and the cation exchange resin, the sample is depleted from LPPs and enriched for EVs.

As used herein, the term "contacts" refers to an exposure of a sample with the size exclusion resin and the cation exchange resin for a suitable period sufficient for purification of extracellular vesicles (EVs) from the sample, if any. In some examples, sample and/or buffers contacts the size exclusion resin and the cation exchange resin via gravity flow as the driving force. In some examples, sample and/or buffer flows through the size exclusion resin and the cation exchange resin via gravity flow as the driving force. In such instances, methods described herein can comprise (i) flowing the sample comprising EVs through a size exclusion resin for a time and under conditions sufficient to separate high density lipoprotein (HDL) from EVs, (ii) thereafter flowing the sample through a cation exchange resin for a time and under conditions sufficient to bind lipoprotein particles (LLPs), and (iii) collecting flow-through comprising EVs.

Conditions sufficient for the size exclusion resin to filter out small analytes and for the cation exchange resin to capture positively-charged particles include, but are not limited to, suitable flow rates, suitable pressures, suitable temperatures, suitable pH ranges, and suitable packing densities of the chromatography resins to achieve desired results (e.g., purification of EVs). In some examples, such conditions can based on the particular chromatography resin used in the device and/or method. For example, when the size exclusion resin is Sepharose CL-4B, conditions sufficient for the size exclusion resin to filter out small analytes include, but are not limited to, a pH range of 3-14, a maximum pressure of 120 cm $H_2O$, and a maximum volumetric flow rate of 2.17 mL/min, a maximum linear flow rate of 26 mL/cm$^2$h, and combinations thereof. Alternatively, or in addition to, when the cation exchange resin is Fractogel EMD SO$_3^-$, conditions sufficient for the size exclusion resin to filter out small analytes and for the cation exchange resin to capture positively-charged particles include, but are not limited to, a pH range of 1-13, a maximum pressure of 8 bar, a maximum linear flow rate of 200 cm/h, and combinations thereof.

When performing dual-mode-chromatography (DMC) methods disclosed herein, in some embodiments, the size exclusion resin and the cation exchange resin can be disposed in the same column, syringe, or pipette tip. In other examples, the size exclusion resin and the cation exchange resin can be disposed in different columns, syringes, or pipette tips. In such instances, a membrane and/or a filter can be used to retain the size exclusion resin and/or the cation exchange resin in the column, syringe, or pipette tip.

In some examples, dual-mode chromatography (DMC) methods disclosed herein can be carried out using any of the DMC devices described herein (e.g., a dual-mode chromatography (DMC) column described herein).

For example, using a device 100 as shown in FIG. 1, a sample can be loaded into the column 110 of the device 100 via the inlet opening 150. As the sample travels through the column 110, the sample contacts and first passes through the size exclusion resin 120, which separates small analytes (e.g., soluble proteins and high density lipoprotein (HDL)) from the extracellular vesicles (EVs) in the sample. The sample then contacts and passes through the cation exchange resin 130, which captures positively-charged particles (e.g., low-density lipoprotein LDL and very low-density lipoprotein (VLDL)) to separate them from the extracellular vesicles (EVs) in the sample. The sample then exits the column 110 via the outlet opening 160.

The resulting sample is depleted from LPPs and enriched for EVs. The sample can be collected using any suitable container such as a centrifuge tube. The sample thus collected can be used in any downstream application of extracellular vesicles (EVs) such as biomarker assays. In some instances, the sample is stored prior to its use.

Any suitable sample comprising extracellular vesicles (EVs) can be used in the DMC methods described herein. A sample includes both an initial unprocessed sample as well as subsequently processed, e.g., partially purified or preserved forms. The sample can be obtained from a mammal such as a mouse, rat, guinea pig, rabbit, dog, cat, bovine, horse, goat, sheep, primate or human. In some examples, the sample is a blood sample, a plasma sample, or a serum sample. In other examples, the sample is a cell culture sample (e.g., a cell culture supernatant), which can be obtained from an in vitro culture.

Any suitable amount of sample can be used in dual-mode chromatography (DMC) methods described herein. In some examples, the sample is between 0.1 to 5 mL. In some examples, the sample is between 0.5 to 5 mL, between 1 to 5 mL, between 2 to 5 mL, between 3 to 5 mL, between 4 to 5 mL, between 0.1 to 4 mL, between 0.1 to 3 mL, between 0.1 to 2 mL, between 0.1 to 1 mL, or between 0.1 to 0.5 mL.

Dual-mode chromatography (DMC) methods described herein can further comprise subjecting a sample to one or more processing steps. In such instances, the sample can be processed prior to performing dual-mode chromatography (DMC) to remove unwanted molecules, cells, cell debris, or other contaminants present in the sample. The processing step can be achieved using centrifugation (e.g., differential centrifugation), filtration (e.g., ultrafiltration), or a combination thereof. When more than one processing step involving centrifugation is performed, the sample can be centrifuged at the same speed or at different speeds (e.g., first at a lower speed and then at a higher speed). In some examples, the sample is centrifuged twice at 2,500 g.

Dual-mode chromatography (DMC) methods described herein can further comprise one or more concentration steps. In some examples, the sample is concentrated prior to performing a dual-mode chromatography (DMC) method. Alternatively, or in addition to, the sample can be concentrated after performing dual-mode chromatography (DMC).

The one or more concentration steps can be performed by ultrafiltration, which can also serve as an additional purification step. Any suitable ultrafiltration technique can be used in dual-mode chromatography (DMC) methods described herein including ultrafiltration with a filter or a membrane. In such instances, the filter or the membrane can have a molecular weight cut-off of 100 kDa, 50 kDa, 30 kDa, or 10 kDa. In some embodiments, the filter or the membrane can have a molecular weight cut-off of 10 to 100 kDa. In some embodiments, the filter or the membrane can have a molecular weight cut-off of 10 to 50 kDa, 20 to 50 kDa, 30 to 50 kDa, 40 to 50 kDa, 10 to 40 kDa, 10 to 30 kDa, 10 to 20 kDa, 20 to 30 kDa, or 30 to 40 kDa.

Any suitable buffer can be used in dual-mode chromatography (DMC) methods described herein. Buffers include loading buffers, wash buffers, and elution buffers. In some examples, the buffer is phosphate-buffered saline (PBS). In some examples, the buffer can comprise one or more additional components such as salt, detergent, or a combination thereof The present disclosure also includes uses of dual-mode chromatography (DMC) (e.g., DMC devices and/or DMC methods) for a variety of purposes that involve purifying and/or using extracellular vesicles (EVs) including, but not limited to, clinical purposes such as treating a disease, identifying a subject having a disease (e.g., liquid biopsy), delivering a therapy, selecting a treatment, monitoring a treatment, assessing efficacy of a treatment, determining a course of a treatment, and non-clinical purposes such as research purposes.

IV. Kits for Purifying Extracellular Vesicles (EVs)

The present disclosure also provides kits for purifying extracellular vesicles (EVs). Such kits can include a dual-mode chromatography (DMC) device described herein such as a dual-mode chromatography (DMC) column. In some examples, the kit includes a dual-mode chromatography (DMC) column that is packed with a size exclusion resin and a cation exchange resin. In other examples, the kit includes a column and/or a syringe and one or more containers containing a size exclusion resin and a cation exchange resin, which a user assembles to form a dual-mode chromatography (DMC) device as described herein.

The kit can also include instructions for practicing DMC according to any of the methods described herein. The kit can further include instructions for packing the column or the syringe with the size exclusion resin and the cation exchange resin to form a DMC device as described herein. Instructions supplied in the kits of the present disclosure are typically written instructions on a label or package insert.

The kits provided herein are in suitable packaging. Suitable packaging includes, but is not limited to, containers, bottles, vials, and flexible packaging. Kits can include additional components such as buffers and interpretive information.

Without further elaboration, it is believed that one skilled in the art can, based on the above description, utilize the present invention to its fullest extent. The following specific embodiments are, therefore, to be construed as merely illustrative, and not limitative of the remainder of the disclosure in any way whatsoever. All publications cited herein are incorporated by reference for the purposes or subject matter referenced herein.

EXAMPLES

In order that the invention described may be more fully understood, the following examples are set forth. The examples described in this application are offered to illustrate the methods and compositions provided herein and are not to be construed in any way as limiting their scope.

Materials and Methods

The following materials and methods were used in the Examples set forth herein.

Plasma

The sodium-EDTA plasma was acquired from Rockland Immunochemicals, Inc.

Size-exclusion Chromatography (SEC) and Dual-mode Chromatography (DMC)

Sepharose CL-4B (GE Healthcare), Fractogel EMD $SO_3^-$ (M) (Millipore Sigma), Capto S (GE Healthcare) and SP Sepharose Fast Flow (GE Healthcare) resins were washed three times with PBS buffer. A nylon net with 11 µm pore size (NY1102500, Millipore Sigma) was placed on the bottom of a 10 mL syringe (BD Biosciences). For the SEC column, 10 mL of washed Sepharose was loaded into the column. For the DMC column, 2 mL of ion exchange resin was stacked first, followed by careful layering of 10 mL Sepharose on top. After adding 0.5 mL plasma sample, individual fractions of 1 mL eluate were collected. EV-containing fractions (first 2 fractions after the void volume, which was 3 mL for SEC and 3.6 mL for DMC) were pooled and concentrated using Amicon Ultra-2 10K filters (Millipore Sigma).

EV Preparation for Spike-in Experiments

Figure 3A:
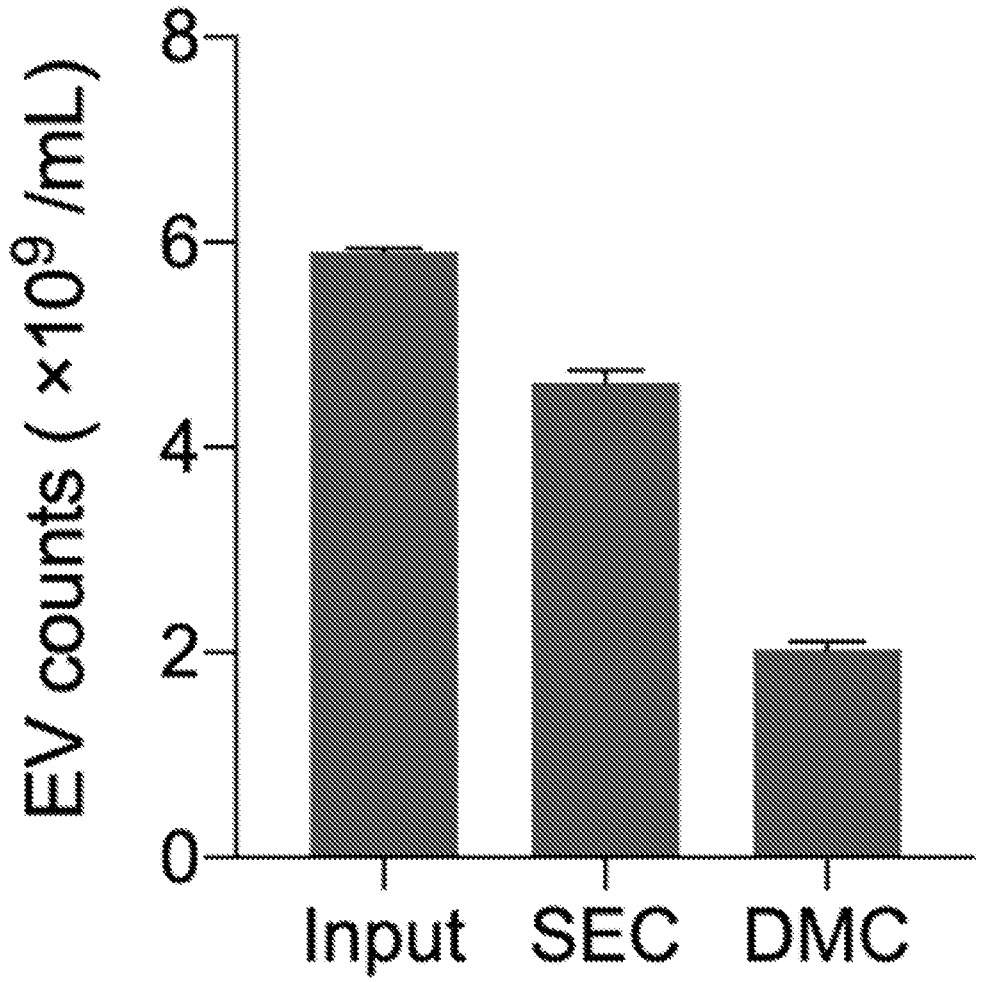
FIGS. 3A-3F include data from characterization of dual-mode chromatography (DMC).
Figure 3B:
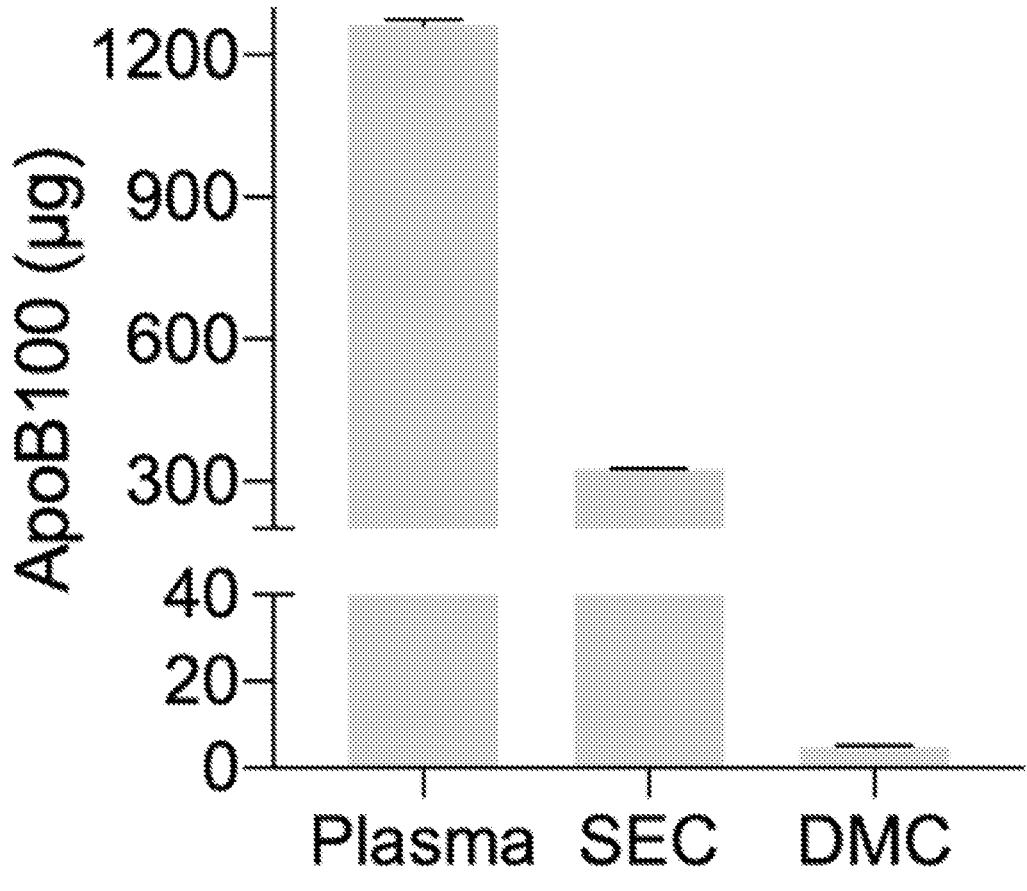
Figure 3C:
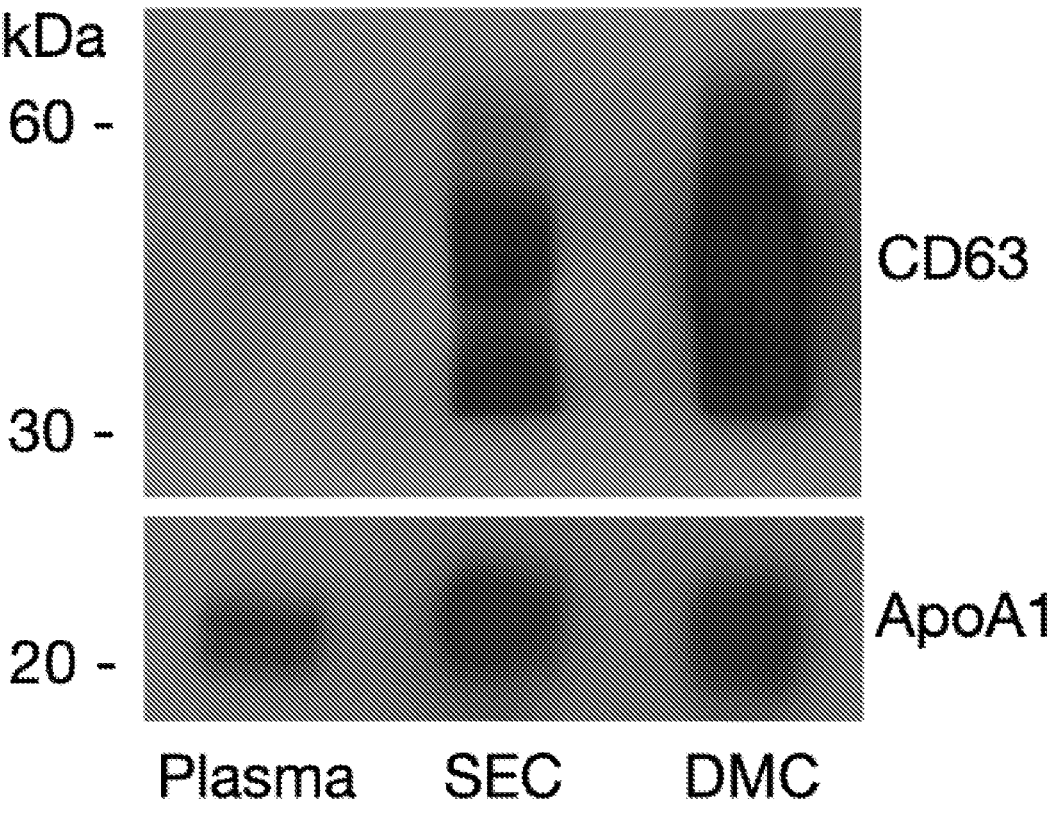
Figure 3D:
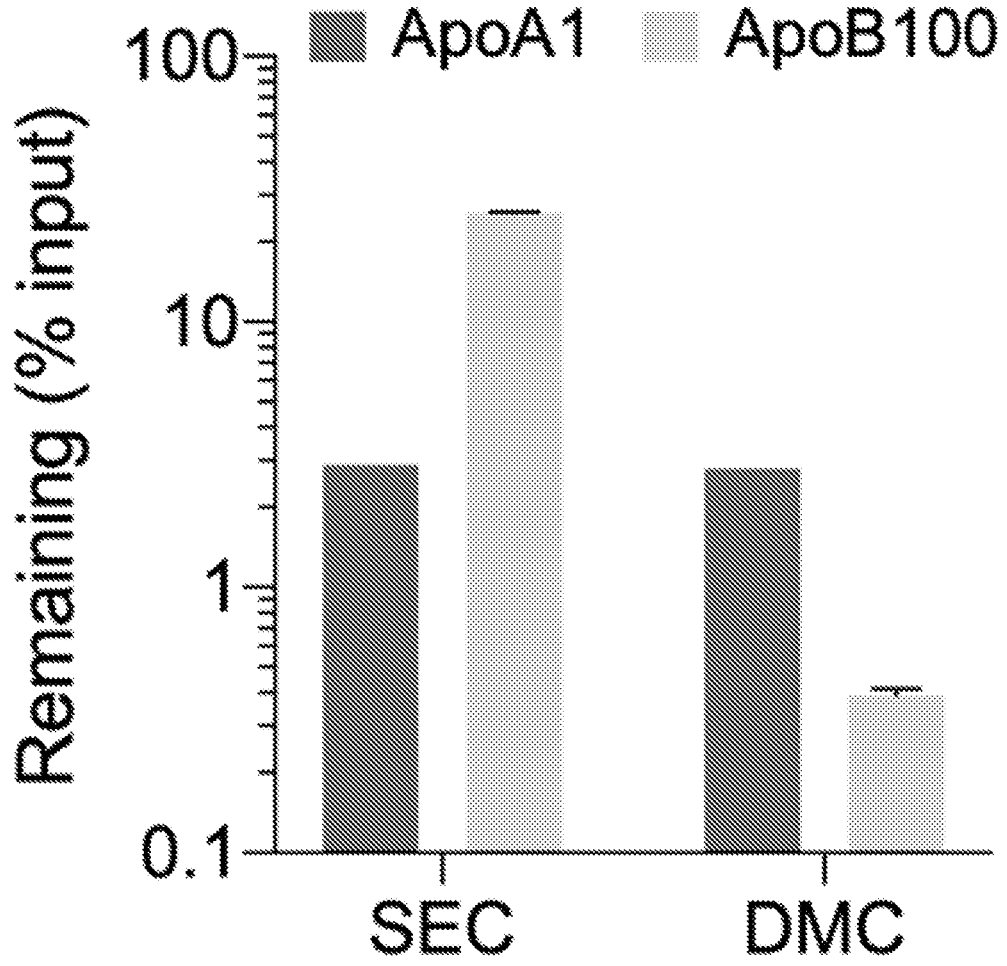
Figure 3E:
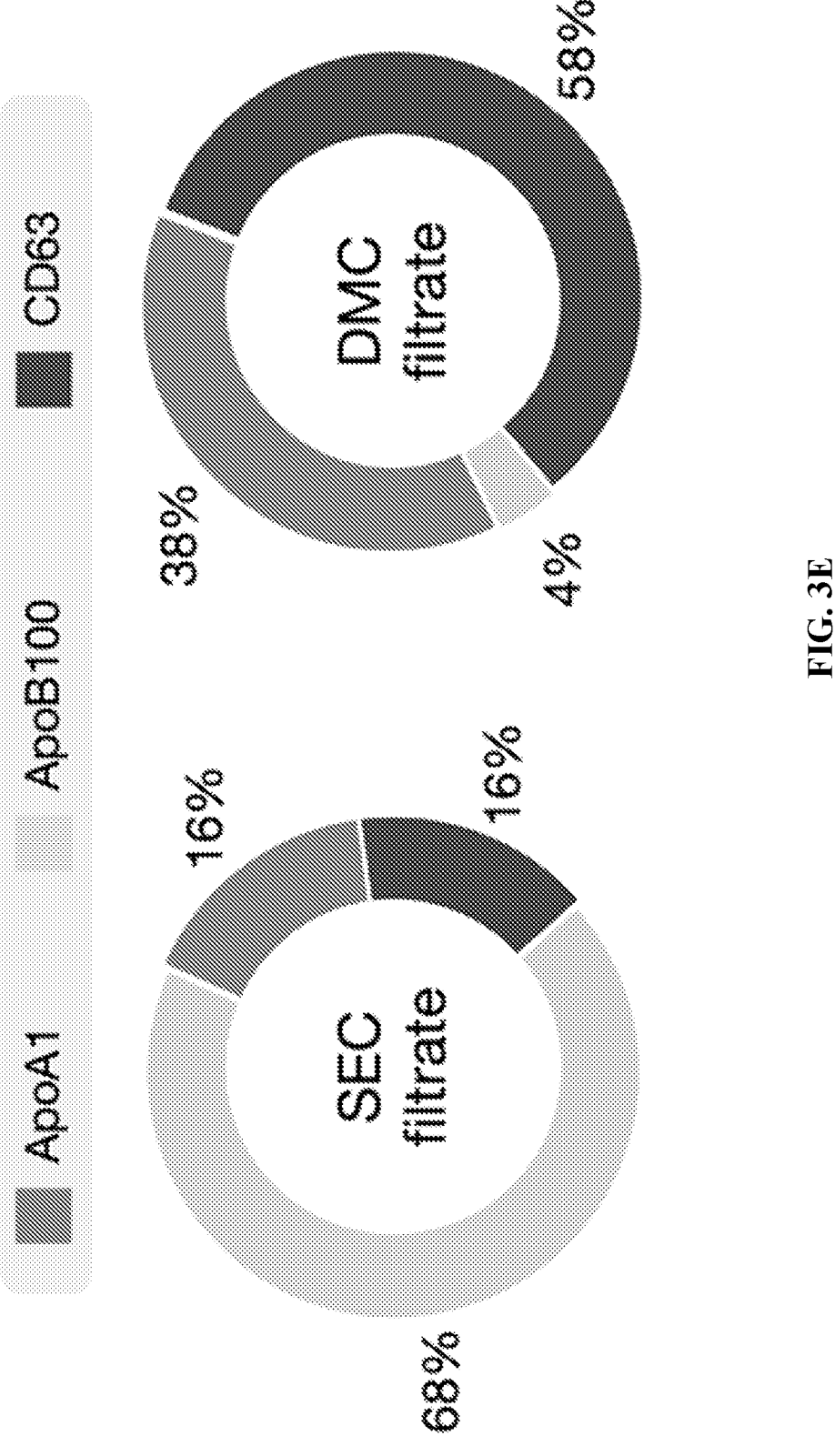
Figure 3F:
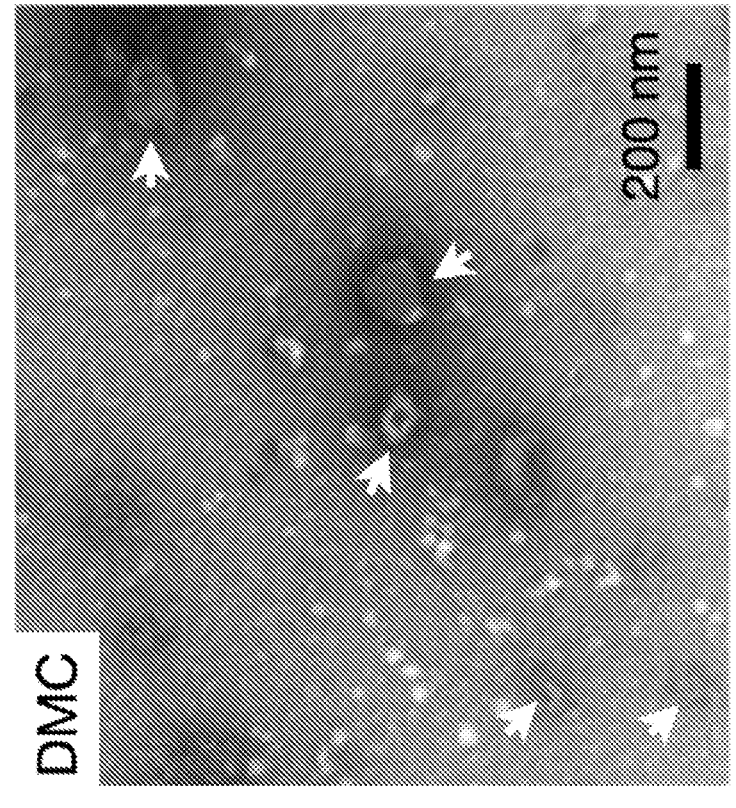
Figure 3F:
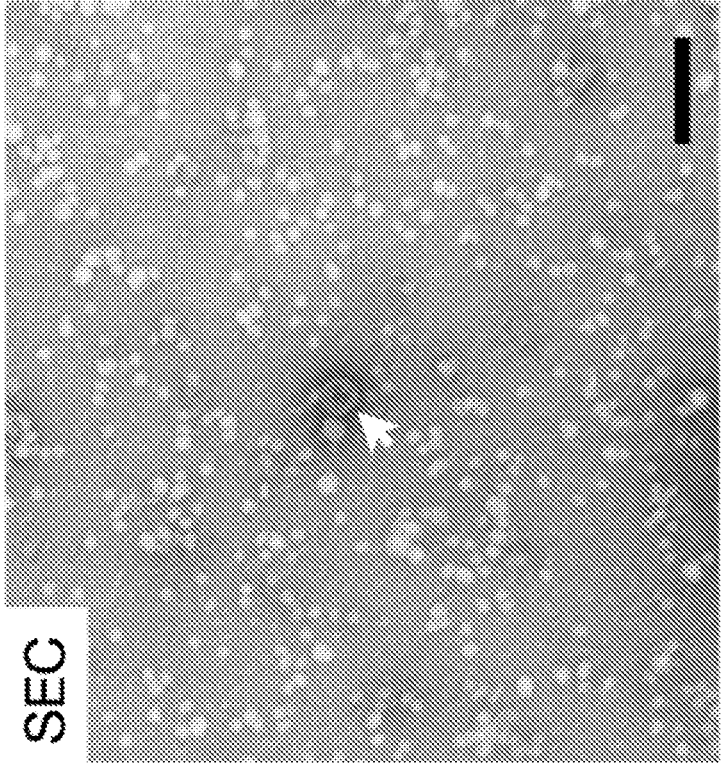
Figure 4A:
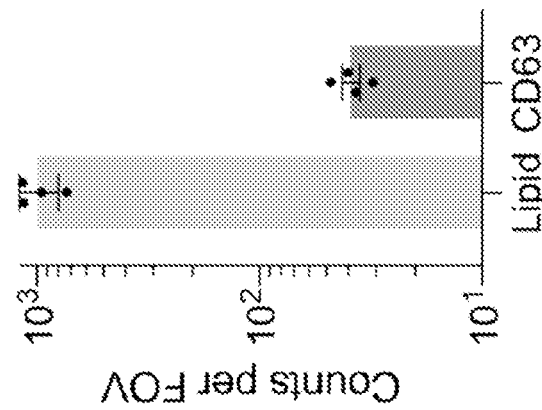
FIG. 4A-4D include data from EV assays with DMC and SEC samples.
Figure 4A:
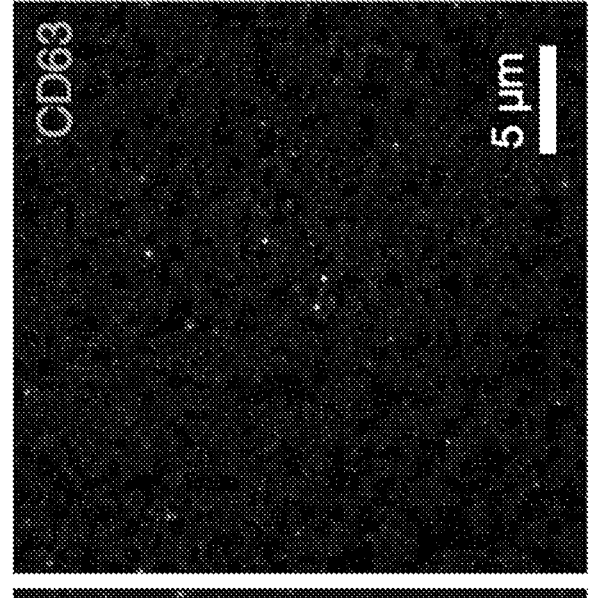
Figure 4A:
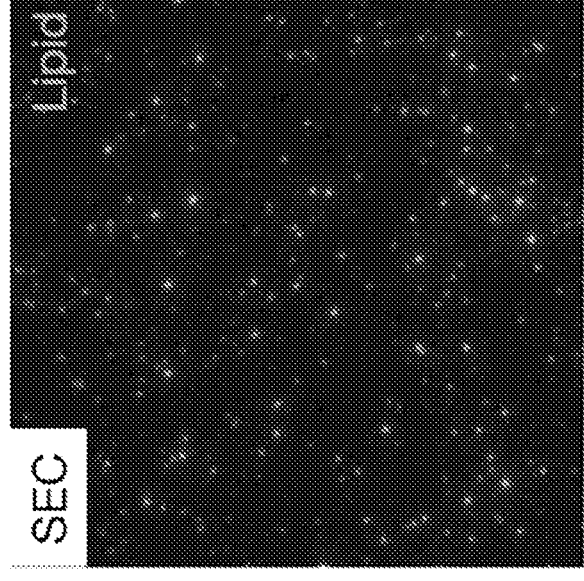
Figure 4B:
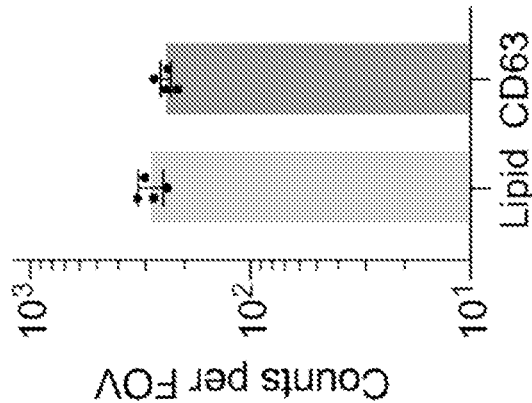
Figure 4B:
Figure 4C:
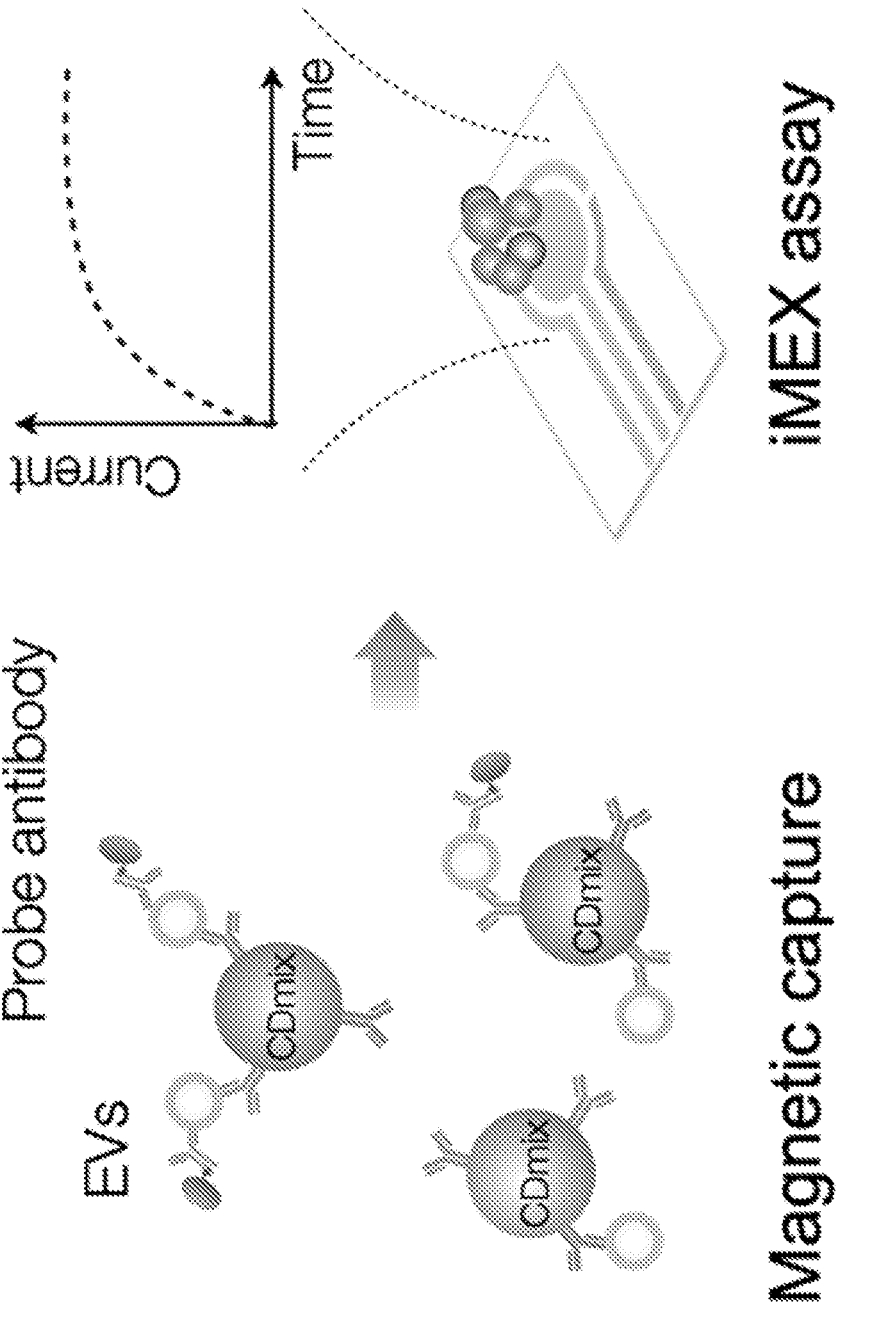
Figure 4D:
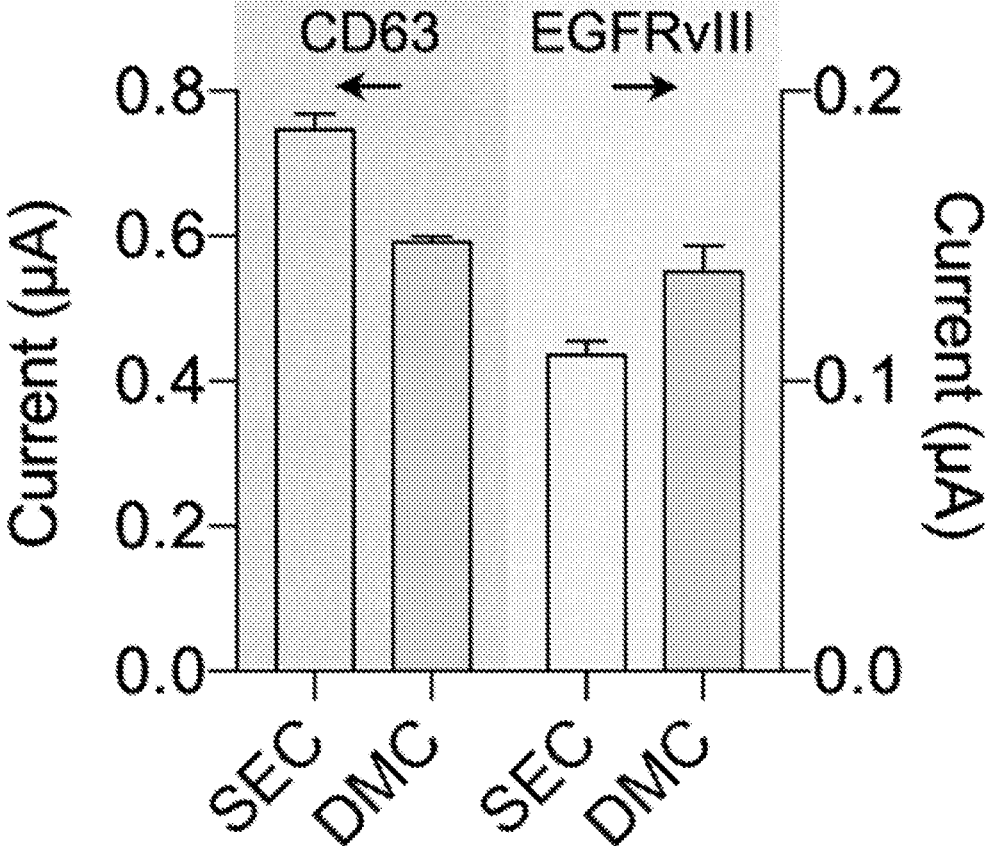

ES-2 cells and Gli36 cells carrying an EGFRvIII mutation (Gli36 EGFRvIII) were cultured in DMEM supplemented with 10% fetal bovine serum. Cells were washed 3 times with serum free medium and cultured in DMEM supplemented with 1% EV-depleted FBS (Invitrogen) for 24 hours. Conditioned medium (CM) from ~$2 \times 10^8$ cells was collected and centrifuged at 300 g (10 min) and 2000 g (20 min). Next, CM was concentrated approximately 300 times using a Centricon Plus-70 centrifugal filter device with a 10K nominal molecular weight limit (Millipore Sigma). Subsequently, a discontinuous OptiPrep density gradient (ODG) was constructed as described previously (Van Deun et al., *Extracell. Vesicles* 2014, 3, 24858). 1 mL of concentrated CM was overlaid onto the top of the gradient, which was then centrifuged for 18 hours at 100,000 g and 4° C. (SW 27.1 Ti rotor, Beckman Coulter). Next, fractions of 1 mL were collected from the top of the gradient, with F9 and 10 (density ~1.1 g mL$^{-1}$) being pooled and used for subsequent SEC-based separation of EVs from the iodixanol polymer, using Sepharose CL-2B as resin. EV-containing fractions (F4-7) were pooled, concentrated to 100 µL, aliquoted, and stored at −80° C. Results were obtained using plasma samples spiked with ES2 EVs (~$7 \times 10^9$ mL$^{-1}$) (FIGS. 3B-3E, FIGS. 4A-4B, FIGS. 7A-7C, and FIGS. 8A-8B); results were obtained using plasma samples spiked with Gli36 EGFRvIII EVs (~$1 \times 10^{10}$ mL$^{-1}$) (FIG. 3F and FIG. 4D). To demonstrate bona fide EV isolation, presence of CD9, CD63 and CD81 was analyzed using bead-based flow cytometry (Figure S7) (Osteikoetxea et al., *Org. Biomol. Chem.* 2015, 13, 9775.).

Nanoparticle Tracking Analysis (NTA)

A NanoSight LM10 microscope (Malvern) equipped with a 405 nm laser was used. Three 30-second videos were recorded of each sample with camera level 15. After each video, the sample was advanced through the chamber to avoid repeated measurement of identical particles in the field of view. Videos recorded for each sample were analyzed with NTA software version 3.2 with detection threshold kept constant at 3. Samples were diluted with PBS buffer until particle concentration was within the linear concentration range of the NTA software ($3 \times 10^8$-$1 \times 10^9$ mL$^{-1}$).

Western Blot and Coomassie Blue

EV samples were lysed in 0.2% SDS and protein concentration measured by Qubit assay (Thermo Fisher). Samples were lysed with non-reducing LDS sample buffer (Invitrogen), boiled for 5 min at 95° C., and loaded on a 5-12% gradient gel (Invitrogen). Proteins were separated by SDS-PAGE, transferred to a nitrocellulose membrane, and immunostained for 1 h with the following antibodies: anti-CD63 (clone H5C6, BD Biosciences, 1:200 dilution) and anti-ApoA1 (clone B-10, Santa Cruz, 1:1000 dilution). HRP-conjugated secondary antibodies were added for 1 h, blots were washed, followed by addition of chemiluminescence substrate (WesternBright Sirius, Advansta). Blots were then developed using autoradiographic films. Films were digitized and quantification of signal intensity was performed using ImageJ. For Coomassie blue staining, gel was stained with SimplyBlue SafeStain (Thermo Fisher) for 1 hour at room temperature, followed by destaining overnight in dH$_2$O at 4° C. Gel was imaged on a Sapphire Biomolecular Imager (Azure Biosystems).

ELISA

Human Apolipoprotein B Quantikine ELISA Kit (R&D Systems) was used according to manufacturer's instructions. Standards and samples were assayed in duplicate.

Cholesterol Assay

The MyQubit Amplex® Red Cholesterol Assay (Thermo Fisher) was used according to manufacturer's instructions.

Electron Microscopy

EV samples (5 µL) were overlaid with Formvar carbon-coated grids and incubated 20 min. Grids were then washed in PBS and fixed for 5 min with 1% glutaraldehyde. Grids were washed in dH$_2$O and incubated on 2% uranylacetate for 5 min. Excess stain was removed by blotting and grids were air-dried. Images were taken using a Tecnai G$^2$ Spirit BioTWIN microscope.

Single EV Imaging

EV-containing SEC and DMC fractions were incubated with CM-DiI (Thermo Fisher Scientific) for 30 min at room temperature. EV-free samples were subjected to the same labeling processes. Dye aggregates were removed by Millex-GV syringe filter (0.22 µm pore size, Millipore Sigma). Filtered EVs were captured on a glass slide. Following 30 min incubation at room temperature, the slide was washed with PBST (PBST buffer containing 0.001% Tween 20). After incubation with fixation buffer (4% formaldehyde) and blocking buffer (Superblock, Thermo Fisher Scientific), EV samples were incubated with anti-human CD63 antibody (Ancell) for 90 min at room temperature. After washing, Alexa Fluor 488-labeled secondary antibody was introduced and incubated for 30 min at room temperature. After final wash steps, fluorescence images were taken with BX-63 upright fluorescent microscope (Olympus) with 40× objective. Acquisition settings (e.g., objective, exposure time, camera setting, and illumination) were kept constant for all images.

iMEX Protocol

Antibodies for EV capture (mouse monoclonal anti-CD63 (clone H5C6, BD Biosciences), CD9 (clone MM2/57, Millipore Sigma) and CD81 (clone 1.3.3.22, Thermo Fisher)) were coupled to Pierce Protein A magnetic beads (Life Technologies) in a ratio of 10 μg of total antibody per 100 μL of beads by overnight incubation at 4° C. with rotation. Beads were washed three times with 500 μL of PBS/0.001% Tween and resuspended in 100 μL of the same buffer. For the iMEX assay, 100 μL of EV samples were mixed with 10 μL of the immunomagnetic bead solution for 15 min at room temperature. After incubation, magnetic beads were separated from the solution with a permanent magnet and re-suspended in 80 μL of PBS (1% BSA). After 5 seconds of vortexing, the beads were separated and re-suspended in 50 μL of PBS (1% BSA). 10 μL of antibodies of interest (20 μg/mL in PBS) were added to the solution and the mixture was incubated for 15 min at room temperature. The magnetic beads were separated and washed as described before and re-suspended in 50 μL of PBS (1% BSA). 5 μL of streptavidin-conjugated HRP enzymes (1:100 diluted in PBS) were mixed with the beads for 15 min at room temperature. The magnetic beads were separated and washed as described before and re-suspended in 7 μL of PBS. The prepared bead solution and 20 μL of UltraTMB solution (ThermoFisher Scientific) were loaded on top of the screen-printed electrode. After 3 min, chronoamperometry measurement was started with the electrochemical sensing device. The current levels in the range of 50-55 seconds were averaged.

Statistical Analysis

All data were displayed as mean±s.d. from technical replicates. Samples numbers and relevant statistical tests are indicated in figure legends. P values<0.05 were considered statistically significant. We used GraphPAD Prism (version 8.0) for analyses. All relevant data obtained from experiments described herein was submitted to the EV-TRACK knowledgebase (EV-TRACK ID: EV200025) (EV-TRACK Consortium, Nat. Methods 2017, 14, 228).

Example 1: Overview of Dual-Mode Chromatography (DMC)

Figure 2A:
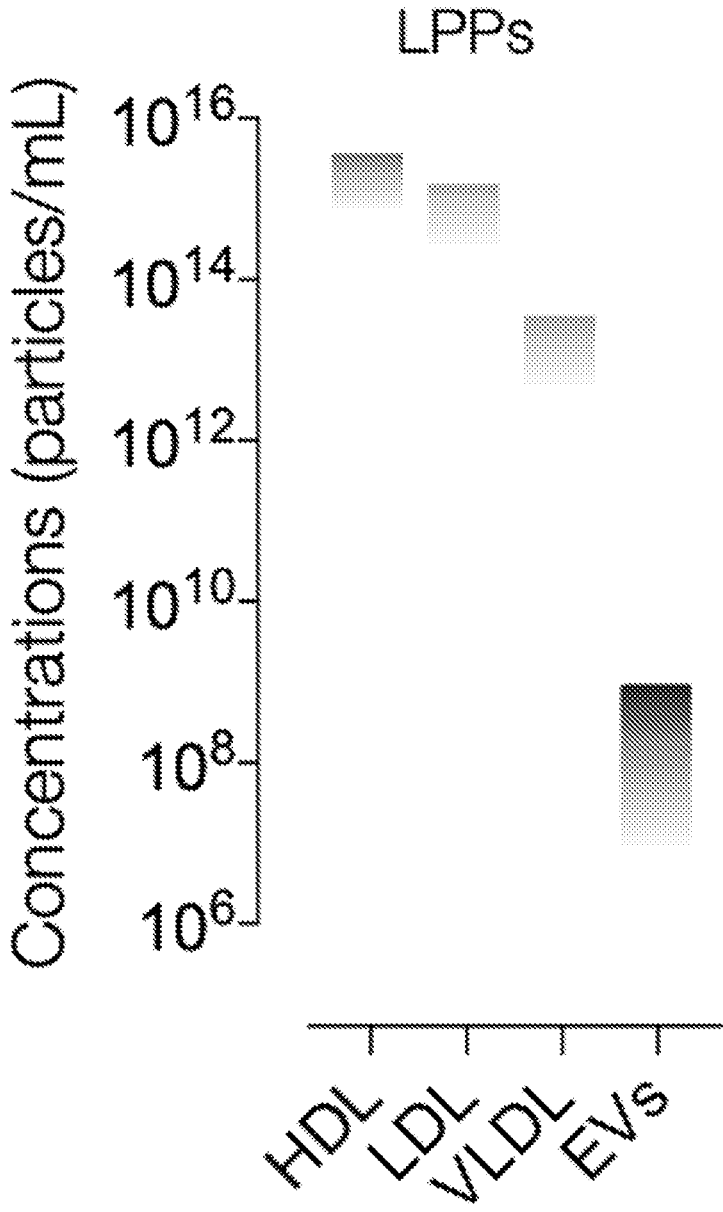
FIGS. 2A-2C are schematic depictions showing an overview of dual-mode chromatography (DMC).
Figure 2B:
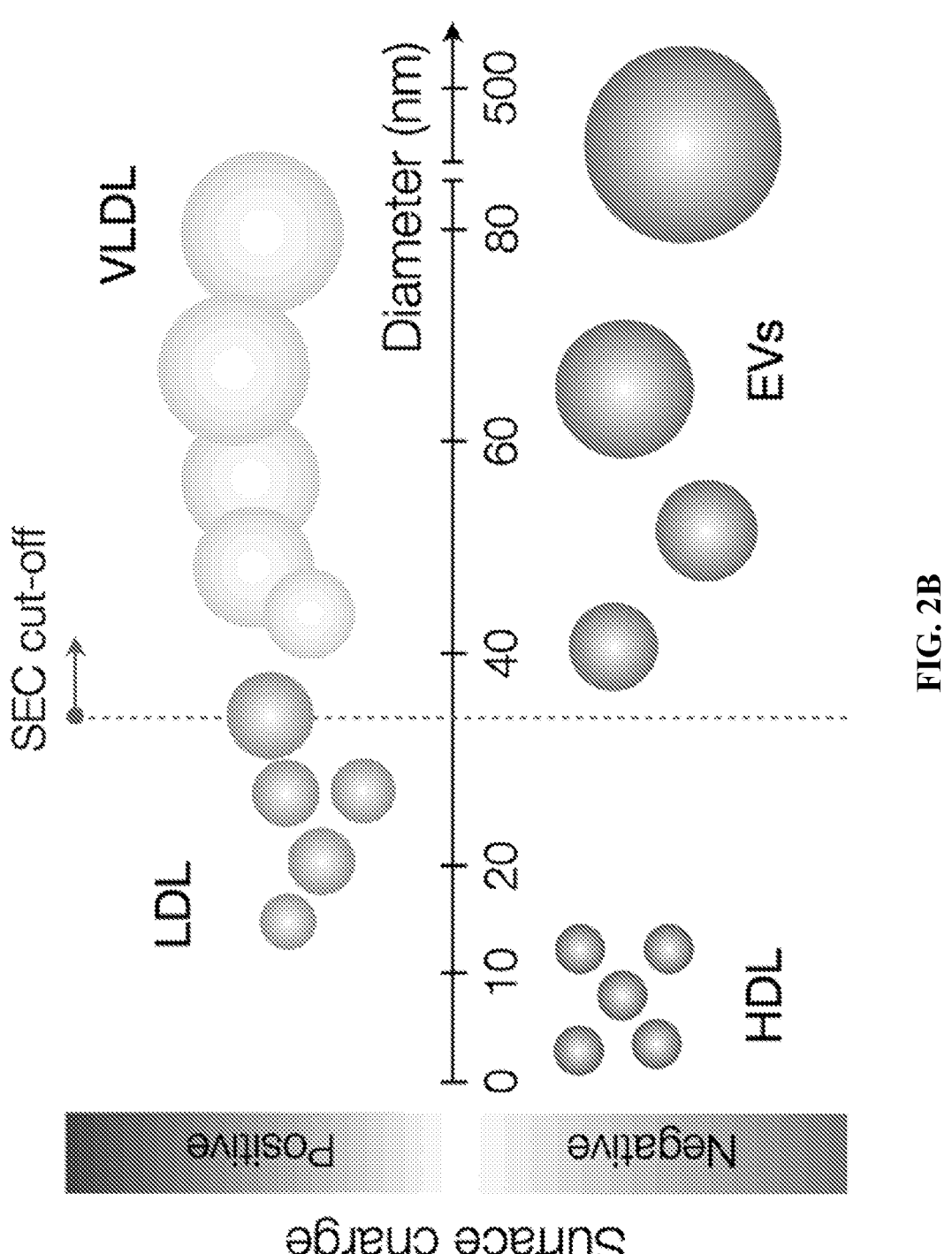
Figure 2C:
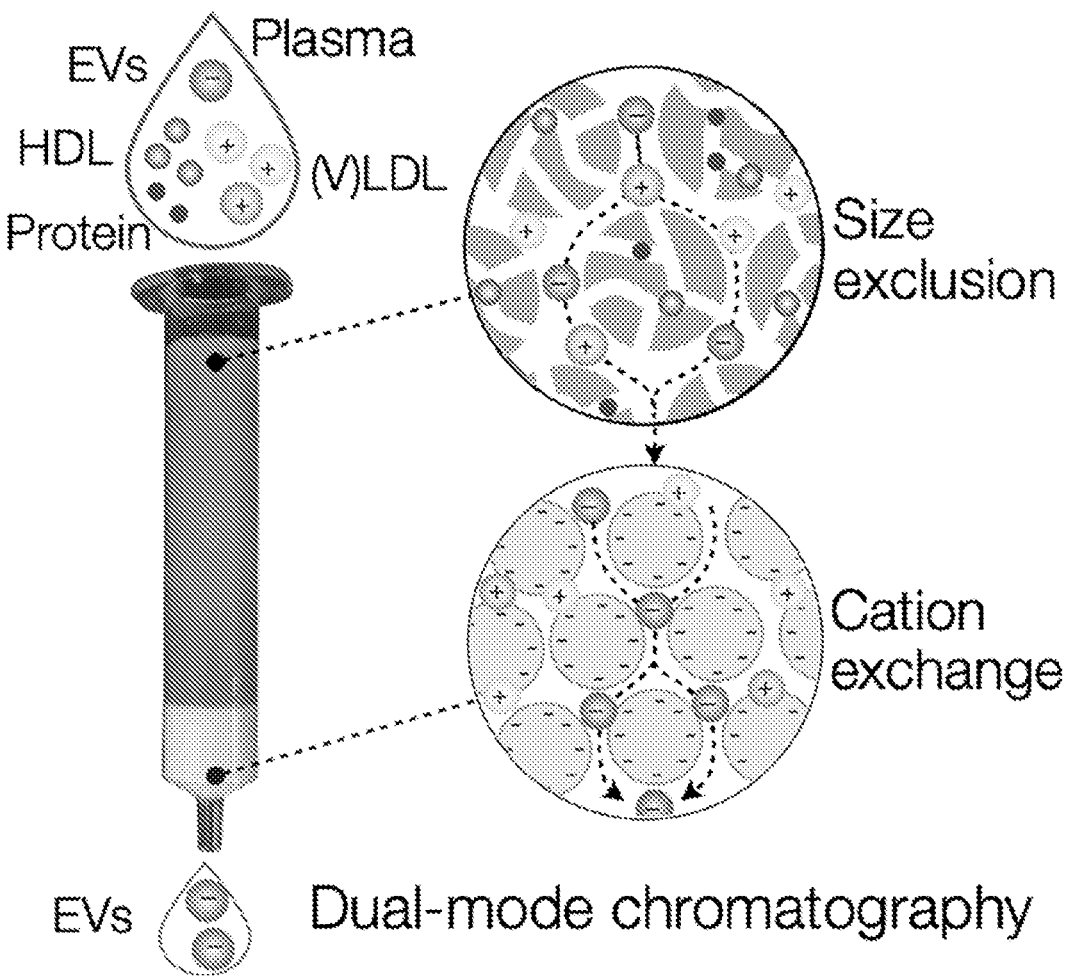

This example describes a substantially improved chromatography method for rapid extracellular vesicle (EV) isolation from plasma samples. Extracellular vesicles (EVs) exist in complex heterogeneous matrices (FIG. 2A), and therefore retrieving pure vesicle populations is challenging. While previous work to discriminate EVs and lipoprotein particles (LPPs) predominantly focused on size and/or density, methods described herein exploit charge discrepancies between negatively charged EVs and positively charged ApoB100-containing LPPs for improved particle separation (FIG. 2B).

The DMC column consists of a top, size-exclusion layer and a bottom, cation exchange layer (FIG. 1C). The top layer separates small analytes (e.g., soluble proteins, protein aggregates, HDL) from larger particles through differential retention time. The bottom layer receives filtrates from the top and captures positively-charged (V)LDL particles. For the top layer, a conventional SEC resin (Sepharose CL-4B, exclusion limit ~35 nm) was used. The resin volume was 10 mL.

Figure 5A:
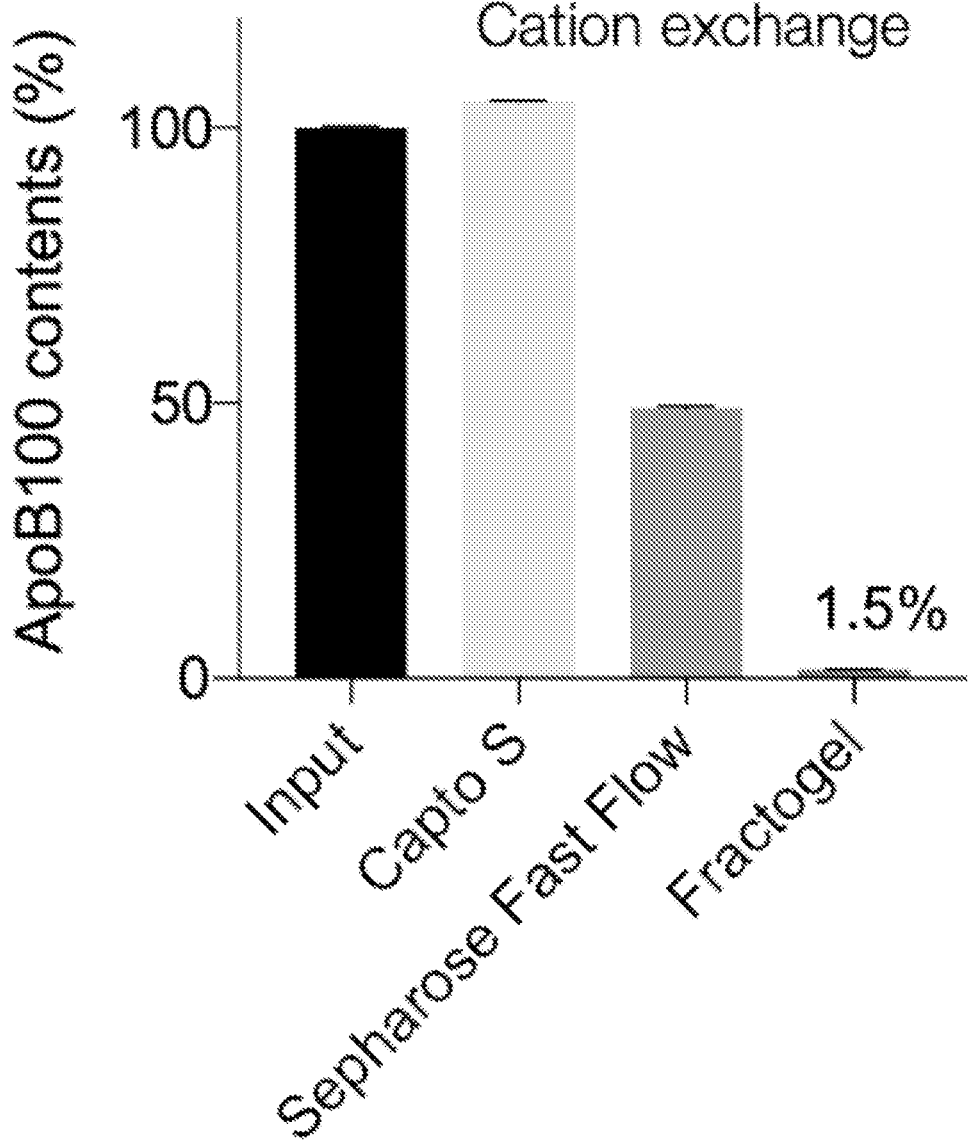
FIGS. 5A-5C include data from optimization of cation exchange columns.
Figure 5B:
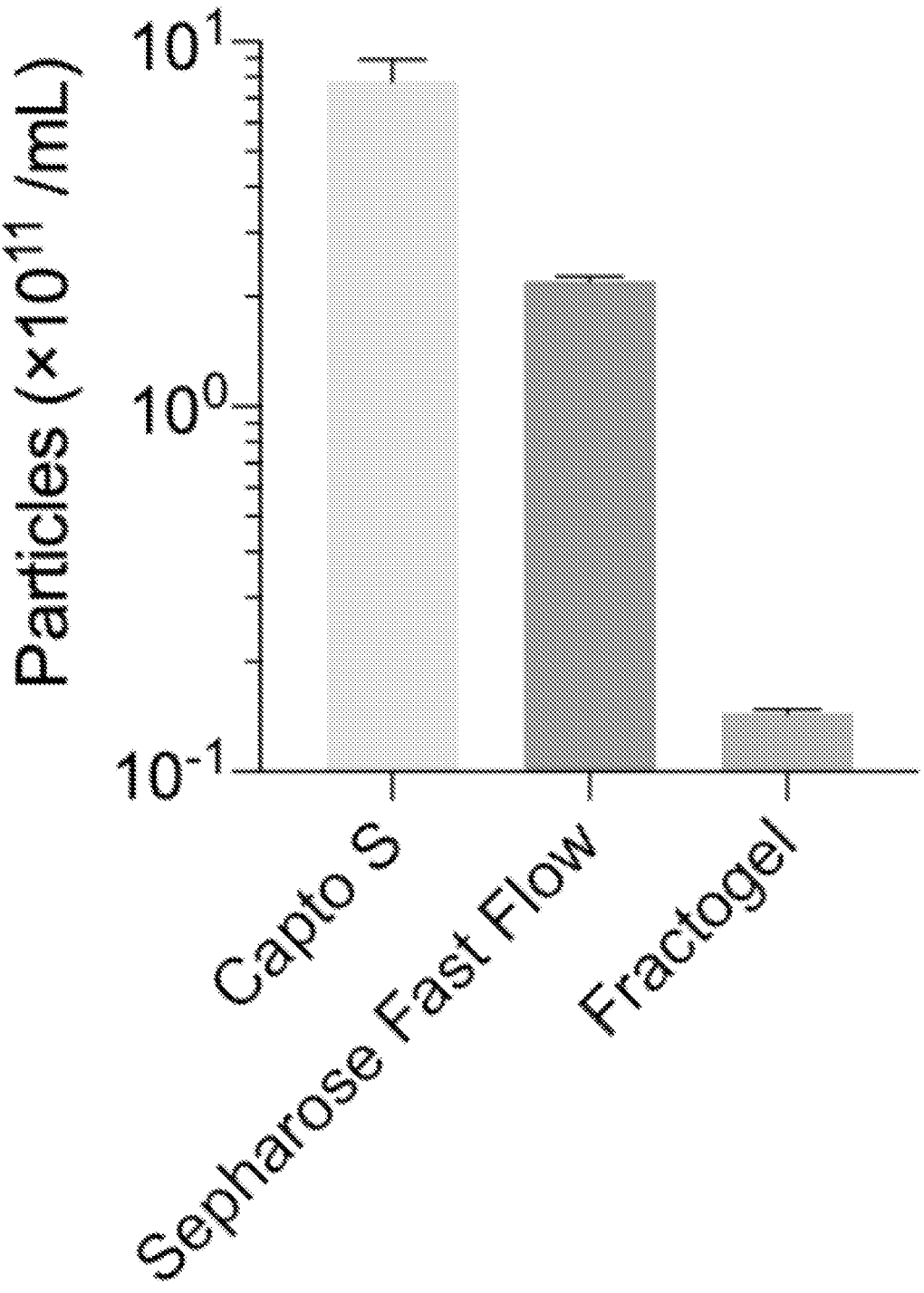
Figure 5C:
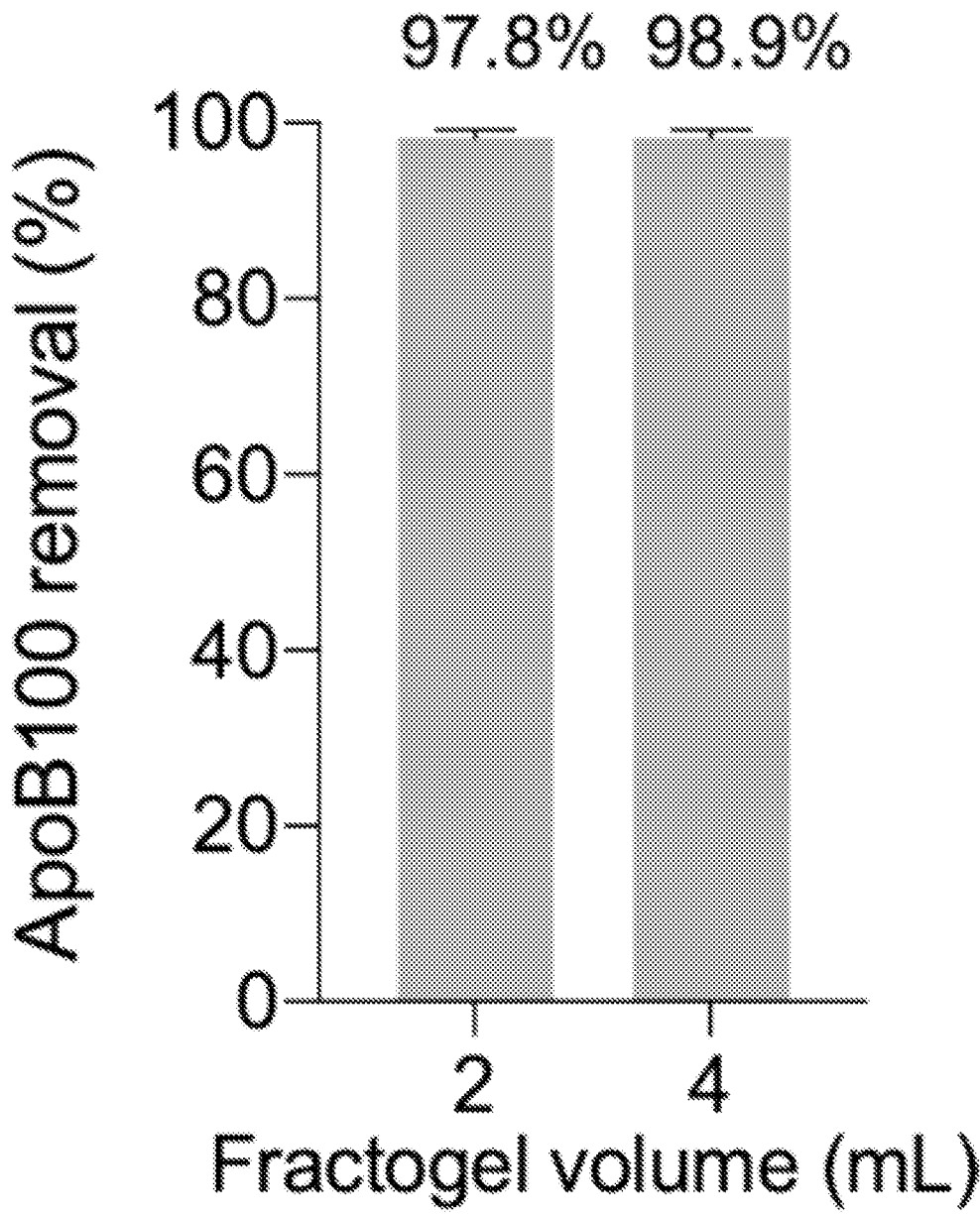

A panel of resins with varying functional groups and physical characteristics were tested for their ability to capture (V)LDL. Cation exchange columns were made, each packed (2 mL) with a single resin type. Test samples were prepared by filtering human plasma through SEC and collecting the EV-enriched fractions, enriching for (V)LDL and EVs. Then, the EV-enriched fractions were processed with the cation exchange columns, assessing each column's ability to remove (V)LDL by measuring ApoB100. Fractogel EMD $SO_3^-$ was found to be most efficient, removing up to 70-fold more ApoB100 than other tested resins (FIGS. 5A-5B), possibly due to its 'tentacle' structure, which promotes interaction between resin and target. The final removal efficiency of ApoB100 was ~98%. Doubling the resin volume (to 4 mL) resulted in only a minor improvement in efficiency (FIG. 5C).

The final DMC column thus had the following dual layer structure: Sepharose (10 mL, top) and Fractogel (2 mL, bottom).

Example 2: Characterization of DMC Column Performance

DMC column performance was characterized and compared to that of a standard SEC column. First, EV recovery ratio was assessed. EV-only samples (cell-line derived EVs in a buffer) were passed through the columns and EV counts before versus after separation were measured via nanoparticle tracking analysis (NTA; FIG. 3A). EV recovery ratios were in the same order of magnitude: 0.34 (DMC) and 0.78 (SEC). DMC's slightly lower value could be attributed to its longer filtering path. Next, the capacity for LPP removal and EV enrichment by DMC and SEC columns was measured. "Clinical samples" were mimicked by spiking human plasma (0.5 mL) samples with EVs (~$10^{10}$/mL) from cancer cell lines as described herein.

Representative lipoprotein markers were ApoA1 for HDL and ApoB100 for (V)LDL, while CD63 was chosen as the EV marker. A significant reduction in ApoB100 after DMC separation was observed (FIG. 3B). When an equal amount (~18 μg) of SEC and DMC sample proteins were analyzed, ApoA1 levels were found to be similar (FIG. 3C), which may reflect the same HDL depletion mechanism (size exclusion) in both columns. CD63 level, however, was markedly higher in the DMC filtrate (FIG. 3C) due to efficient ApoB100 removal. FIG. 3D summarizes the calculated LPP removal efficiency. DMC and SEC columns both effectively cleared HDL particles from plasma, with an efficiency of ~97%. For (V)LDL particles, however, DMC was far superior to SEC: only 0.4% of ApoB100 in the input plasma remained after the DMC filtering, whereas the number was ~25% with the SEC column.

Figure 6:
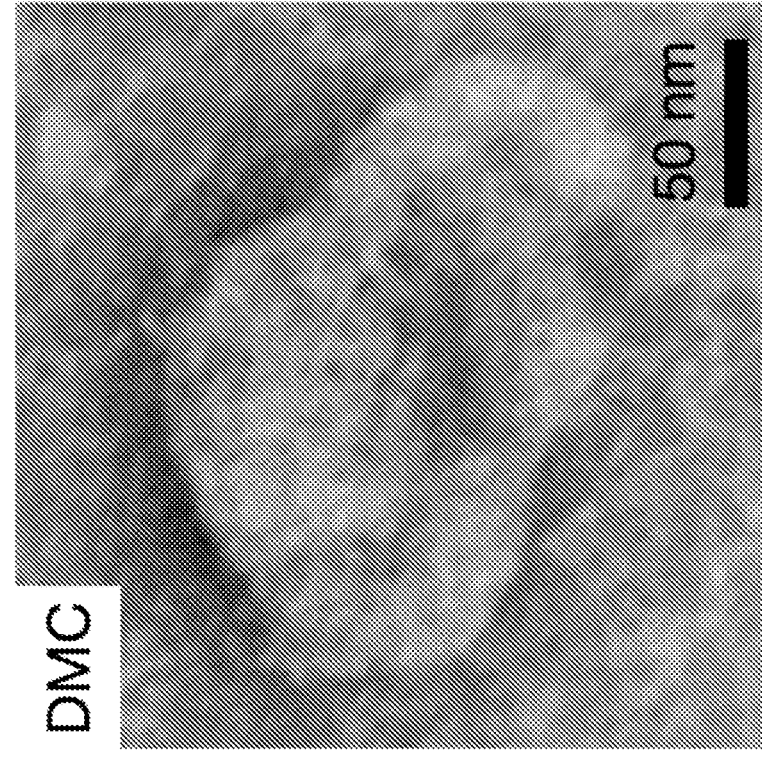
FIG. 6 includes representative images of close-up transmission electron micrographs of SEC-prepared human plasma (left panel) and DMC-prepared human plasma (right panel). EVs, negatively stained, appeared dark; LPPs appeared white.
Figure 6:
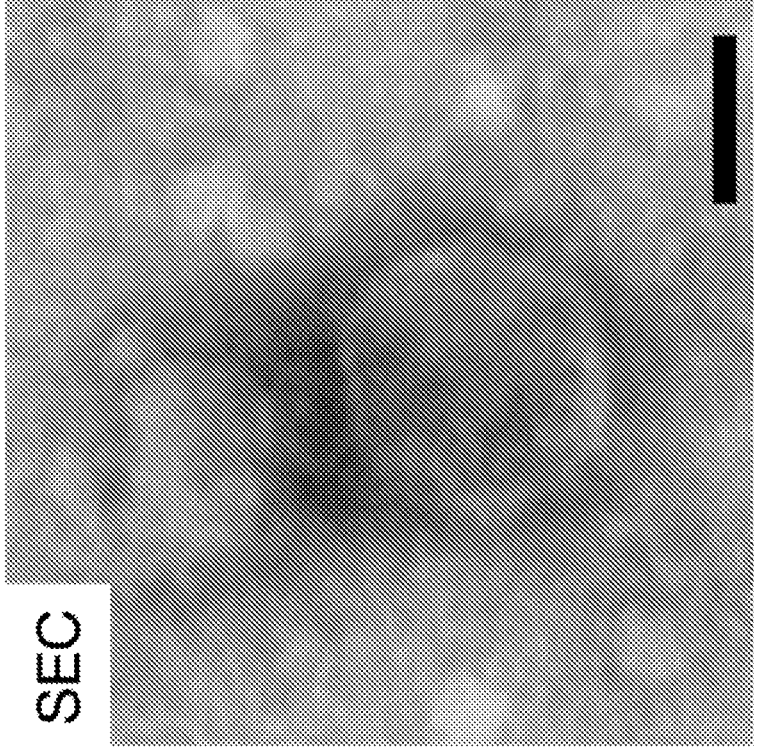
Figure 7A:
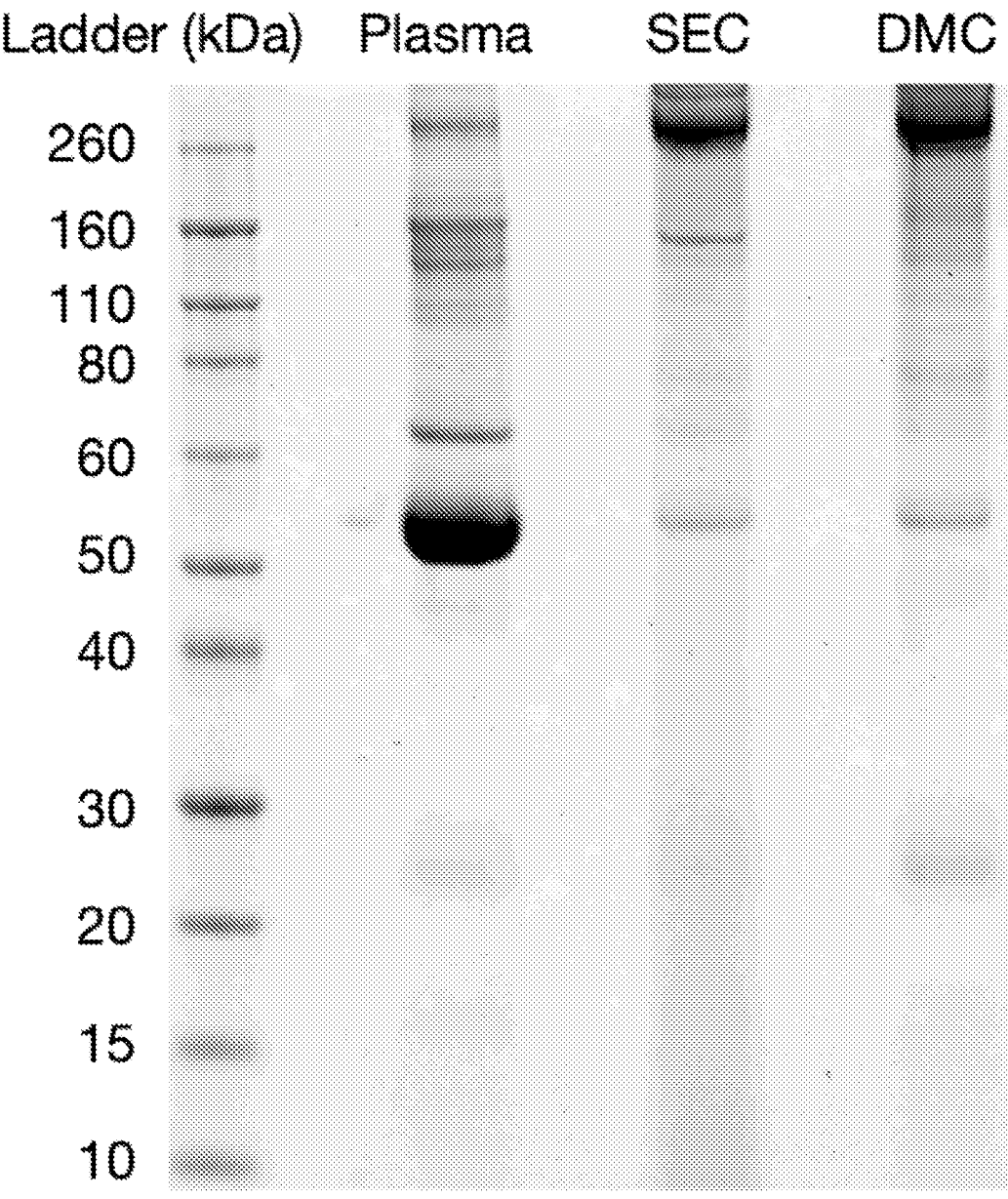
FIGS. 7A-7C include data showing comparison of protein signature, cholesterol content and appearance of SEC- and DMC-prepared samples.
Figure 7B:
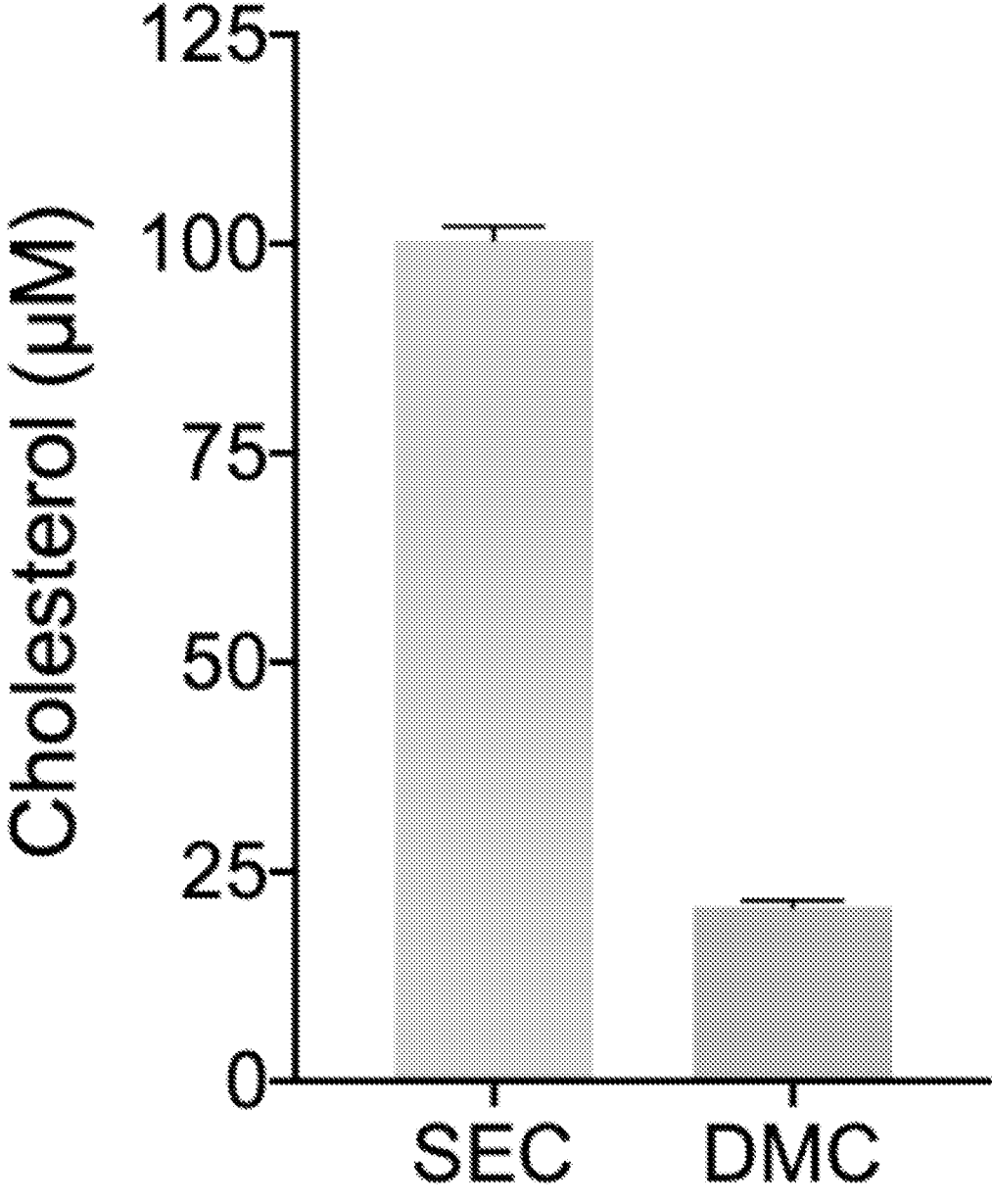
Figure 7C:
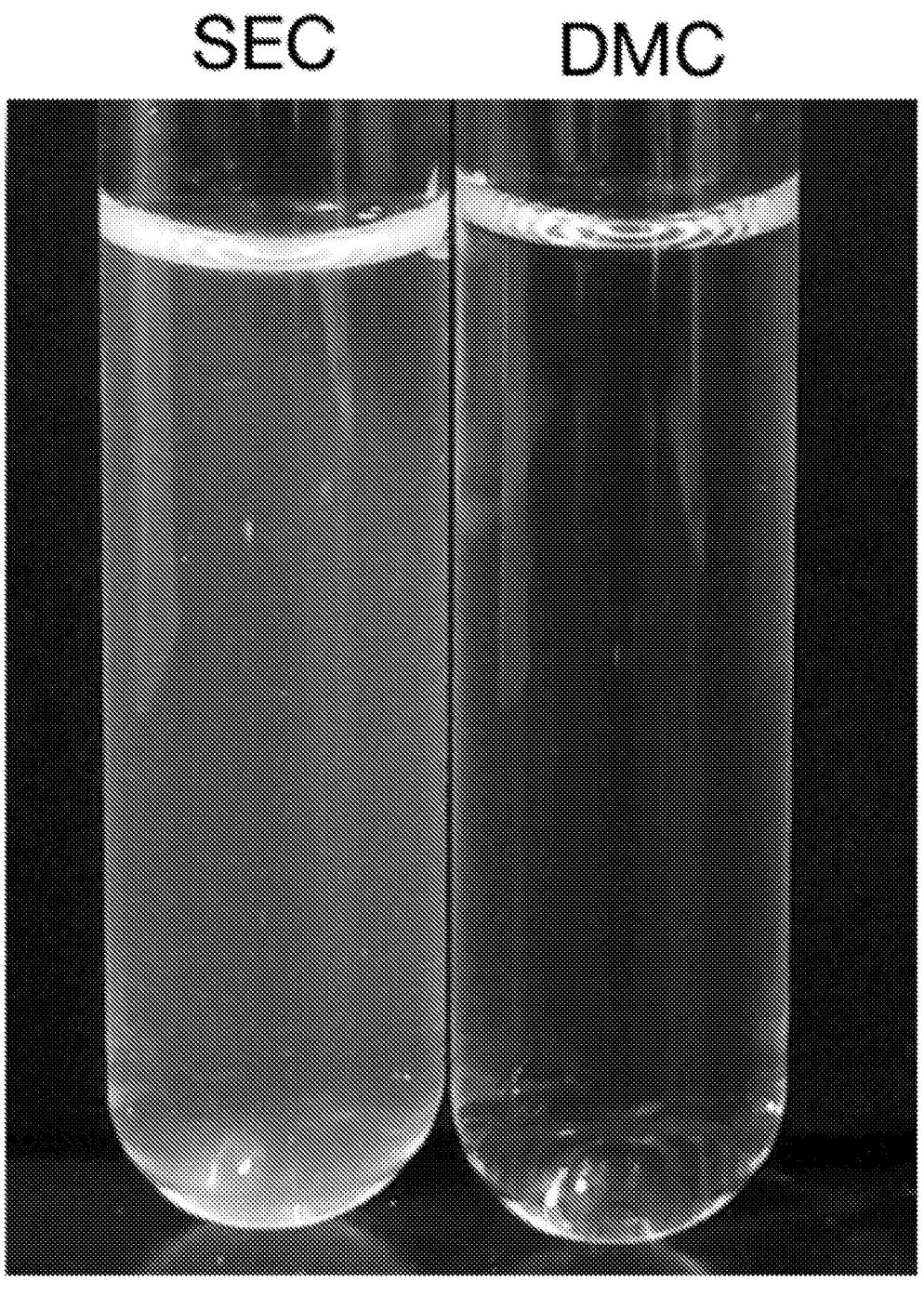

Based on these data, the relative mass ratio of the most significant proteins in SEC- or DMC-prepared samples were estimated. FIG. 3E shows the relative mass fraction of ApoA1, ApoB100, and CD63; the amount of each protein target was estimated from ELISA or Western blotting, and was normalized against the sum of these three proteins. EV protein (CD63) was the dominant fraction (>80%) in the DMC sample, while HDL and (V)LDL were largely removed. The reverse trend was observed in the SEC sample, with LPPs being the major component. Electron microscopy confirmed these observations (FIG. 3F and FIG. 6). DMC-prepared plasma samples contained more EVs and less LPPs than SEC samples. Indeed, overall protein analysis by SDS-PAGE followed by Coomassie blue staining revealed differences in protein profile between these two samples (FIG. 7A). In agreement with lipoprotein particle removal, overall cholesterol levels were found to be ~5 times less in DMC samples (FIG. 7B). As a consequence of lipoprotein removal, DMC-prepared samples appear much clearer than SEC samples (FIG. 7C).

Figure 8A:
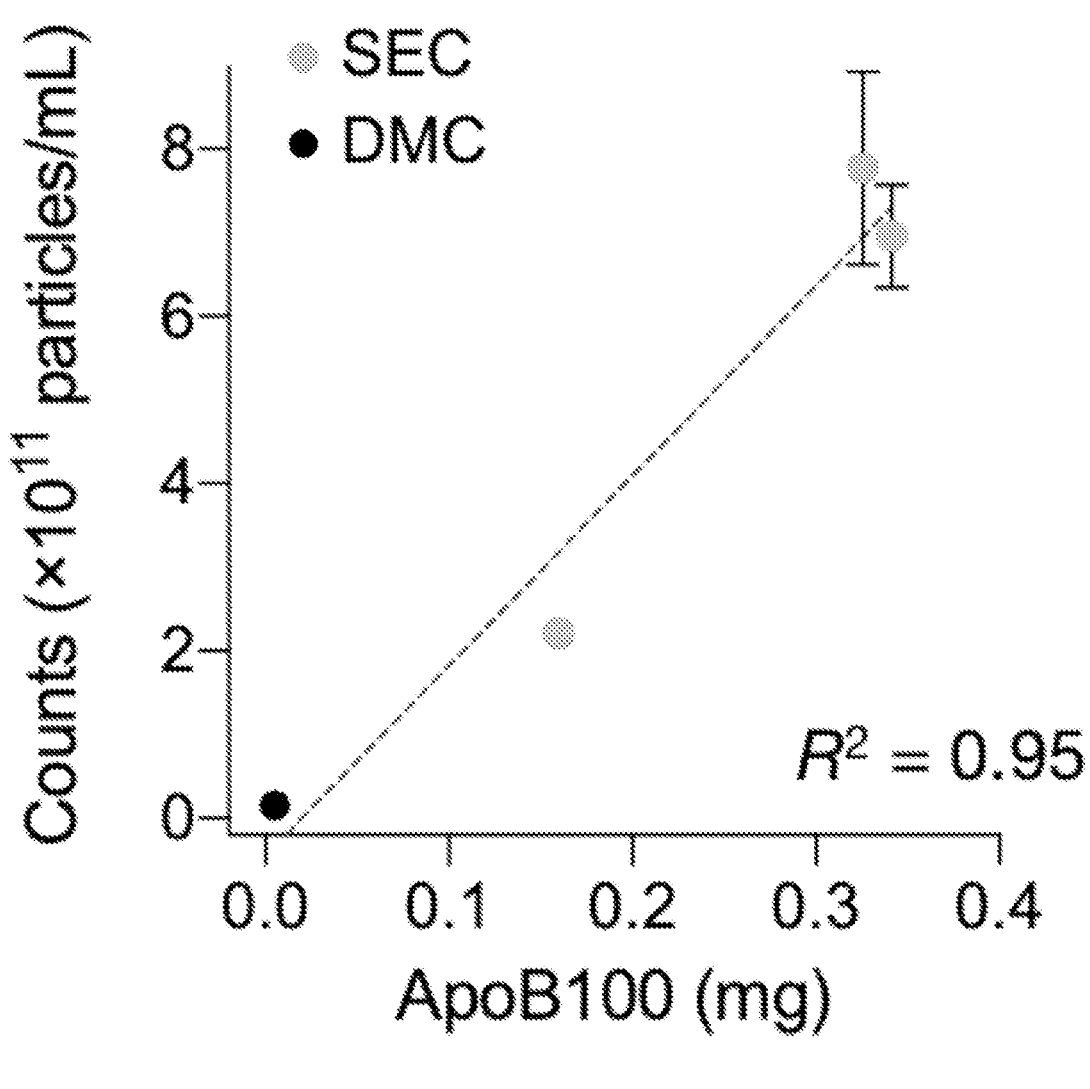
FIGS. 8A-8B include data showing particle counts in plasma EV fractions.
Figure 8B:
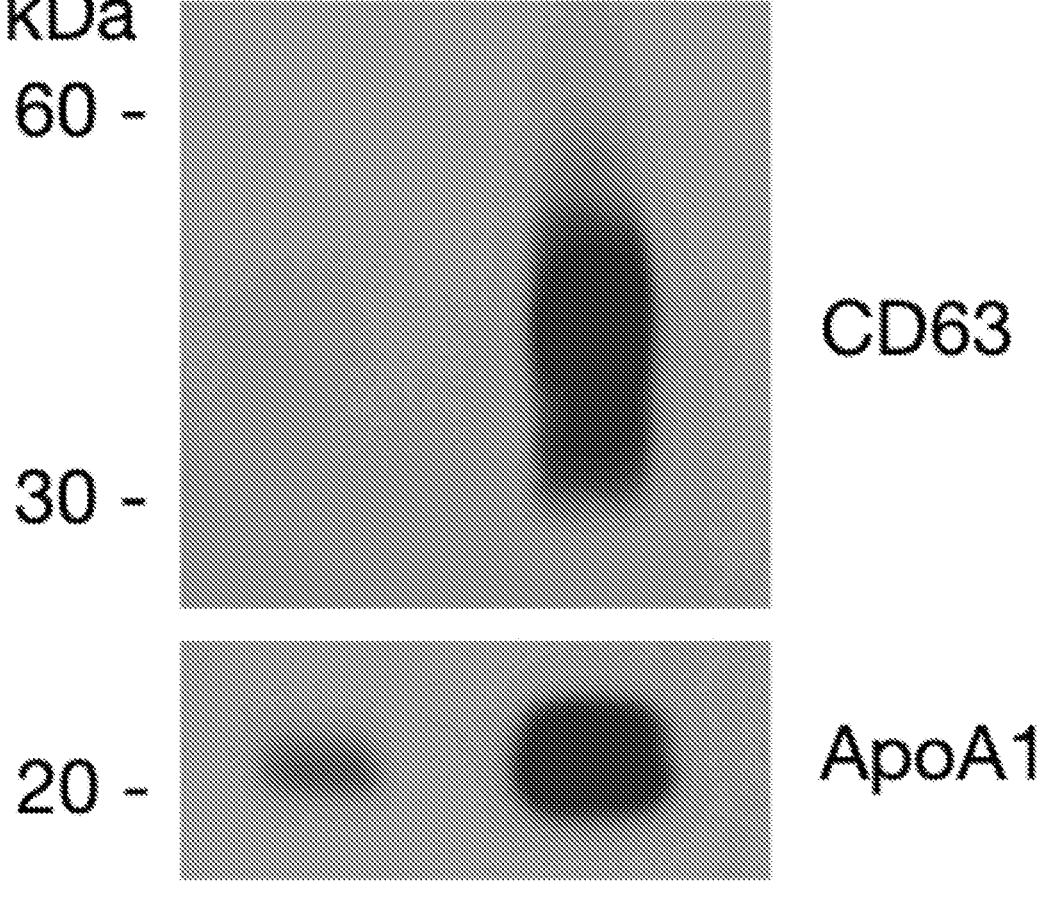
Figure 9:
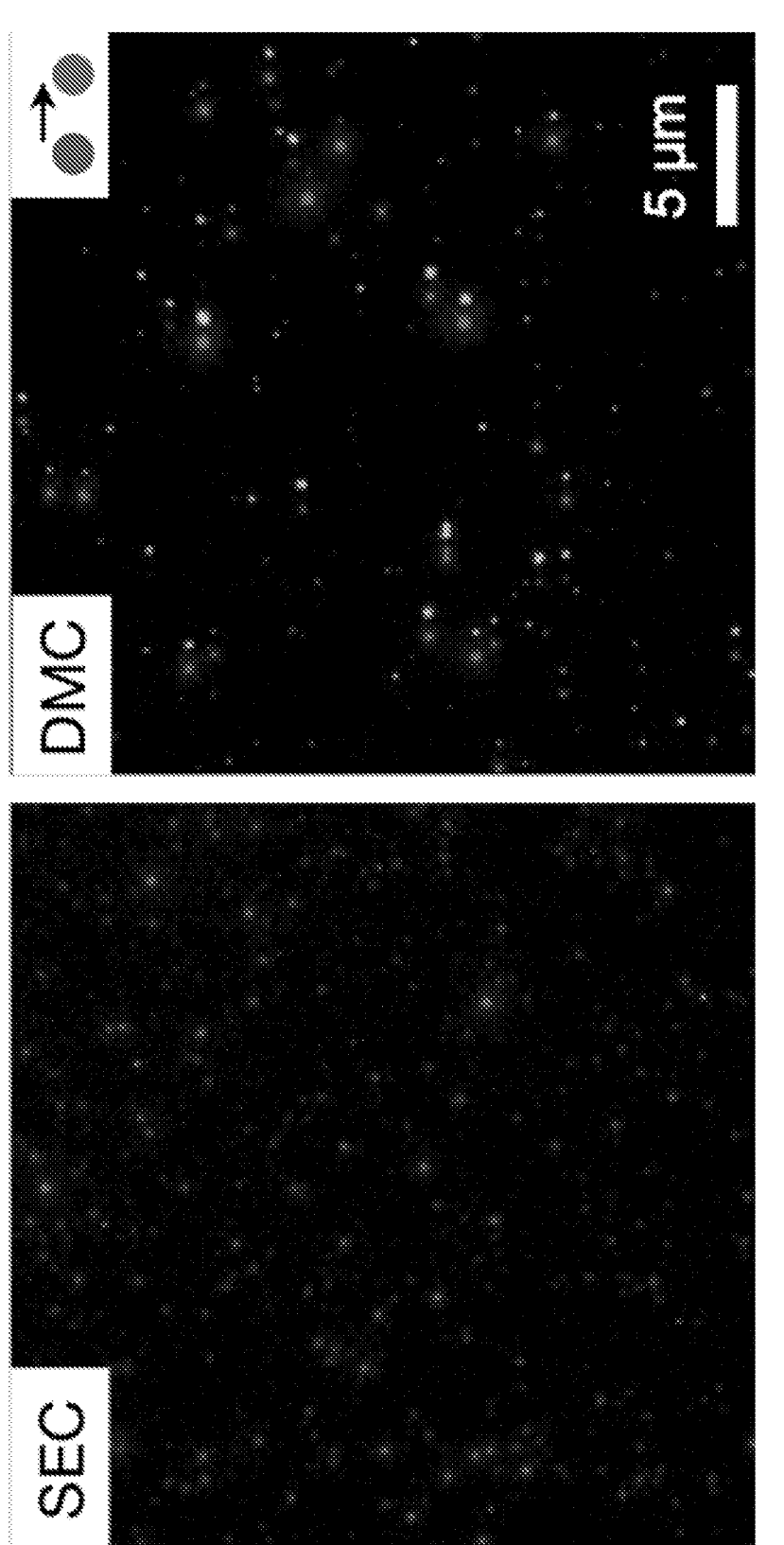
FIG. 9 includes overlay images of lipid and CD63 channels. Two images in different channels were pixel-shifted for better visualization.

After SEC or DMC preparation, it was found that NTA particle counts were directly proportional to ApoB100 amounts in samples (FIG. 8A). This result strongly suggests that the majority of counted particles could actually be (V)LDLs rather than EVs. Western blotting supported this observation. When SEC and DMC samples with the same NTA particle counts were analyzed, negligible CD63 and low ApoA1 levels were observed in the SEC samples (FIG. 8B). Simply counting particle numbers in SEC filtrates, without any molecular specificity, can thus lead to overestimation of EV numbers, even by as much as an order of magnitude. By extension, this implies that calculating particle/protein ratio for estimating EV purity might be less suitable for plasma-derived samples (Webber and Clayton, Extracell. Vesicles 2013, 2, 19861).

Taken together, these results demonstrate improved isolation of EV from plasma samples using the DMC column compared to the SEC column. It was also demonstrated that EV protein was the dominant fraction (>80%) in the DMC sample, which largely was devoid of HDL and (V)LDL. By contrast, LLPs were the major component of the SEC sample (~84%).

Example 3: EV Assays with DMC and SEC Samples

Figure 10:
FIG. 10 includes fluorescent images of a control sample. EV-free samples were subjected to the labeling processes for lipophilic dyes and fluorophore-conjugated anti-CD63 antibodies. No measurable signal was measured in both fluorescent detection channels after the labeling.
Figure 10:
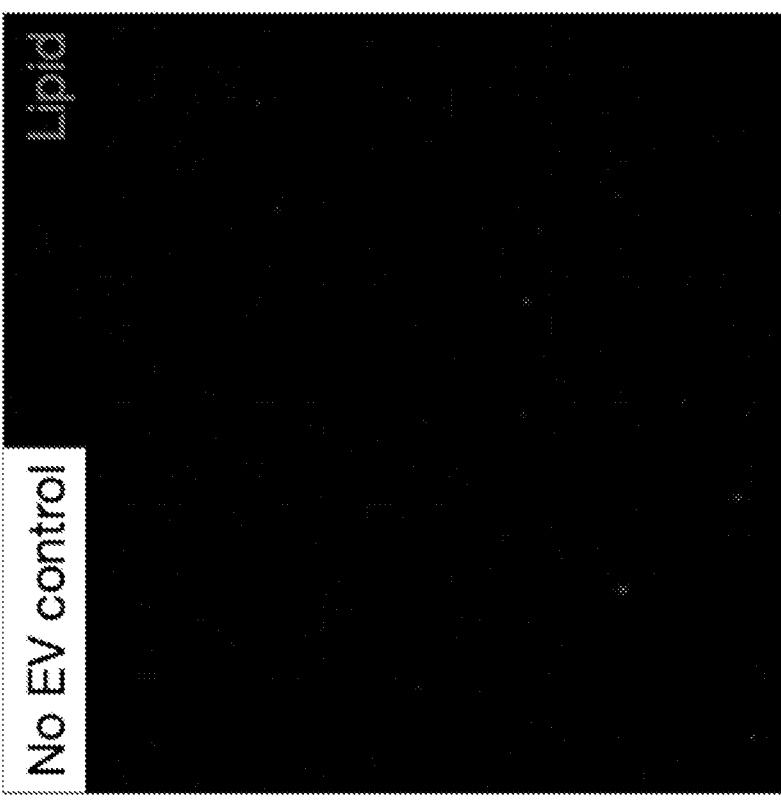
Figure 11:
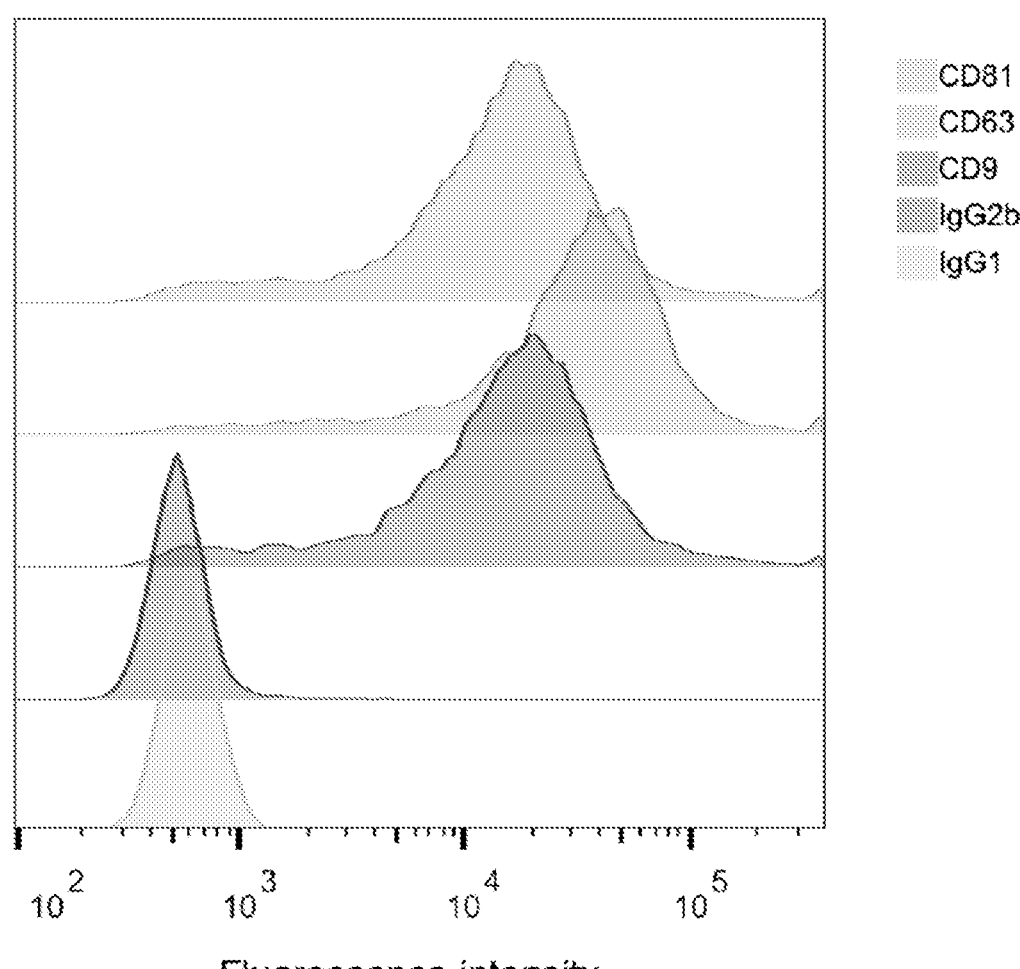
FIG. 11 includes data from analysis of tetraspanins in collected EVs. Representative vesicular markers (CD63, CD81, CD9) were measured by bead-based flow cytometry. EVs derived from derived from ES2 cell culture were used. Filtered EVs were captured on aldehyde/sulphate latex beads (4% w/v, 4 μm, Thermo Fisher) and labeled with primary antibodies: anti-CD63 (1:100, clone H5C6, BD Biosciences), CD9 (1:20, clone MM2/57, Millipore Sigma), CD81 (1:40, clone 1.3.3.22, Thermo Fisher) or isotopematched IgG. For fluorescent labeling, we used AF488-labeled secondary antibodies. All three EV markers were detected in the prepared EV samples. Similar results were obtained for Gli36 EGFRvIII EVs.

To determine whether removing LPP contamination increases the accuracies in EV immunoassays by lowering biological background noise, universal human samples were processed using DMC and SEC columns, and then processed samples were subjected to two different analytical modalities, single particle imaging (Lee et al., *ACS Nano* 2018, 12, 494; and Fraser et al., *Neuro. Oncol.* 2019, 21, 606) and the integrated magnetoelectrochemical exosome (iMEX) assay (Jeong et al., *ACS Nano* 2016, 10, 1802). For single EV imaging, a lipophilic dye was used to stain overall lipid particle populations and a fluorophore-conjugated anti-CD63 antibody was used for EV labeling (FIGS. 4A-4D and FIG. 9). The SEC-only sample had a large lipid particle population, but only a small fraction (~4%) of them were CD63-positive (FIG. 4A). In contrast, the DMC sample was less crowded but more lipid particles (~85%) were CD63-positive, which led to robust EV identification and counting (FIG. 4B). EV-free controls showed no measurable signal in both fluorescent channels after labeling (FIG. 10).

Next, the iMEX assay was used to measure EV surface protein levels in SEC and DMC samples. Test samples were prepared by spiking human plasma (1 mL) with EVs (~$10^{10}$/mL) from a human glioblastoma cell line (Gli36 with EGFRvIII overexpression). Aliquots (0.5 mL) were processed with either SEC or DMC. To capture EVs, magnetic beads specific to tetraspanins (CD63, CD81, CD9) were used. Bead-EV complexes were then further labeled with probing antibodies (CD63 or EGFRvIII) for signal generation (FIG. 4C). The iMEX results (FIG. 4D) showed that CD63 levels effectively followed the EV recovery ratio of SEC and DMC (FIG. 3A), whereas EGFRvIII signal was more pronounced in the DMC sample. These results may be caused by differences in target molecule concentrations.

CD63 level in plasma would be higher than that of EGFRvIII, which makes CD63 detection less affected by biological background (e.g., LPPs); for the less abundant EGFRvIII, removing interfering LPPs makes the analytical signal more robust.

Taken together, these results demonstrate that removal of abundant LPPs in DMC-prepared samples facilitated EV identification in imaging analyses and improved the accuracy for EV protein analysis.

In sum, the present disclosure provides a new single step, chromatography approach for extracellular vesicle (EV) enrichment referred to as dual-mode chromatography (DMC). This approach was evaluated with plasma, the most commonly used bodily fluid for EV analysis. DMC effectively removed most plasma LPPs: >97% HDL, similar to SEC; and >99% (V)LDL, >60-fold more efficient than SEC. As a result, DMC produced enriched EV populations that improved analytical outcomes in EV immunoassays due, in part, to lower background.

OTHER EMBODIMENTS

All of the features disclosed in this specification can be combined in any combination. Each feature disclosed in this specification can be replaced by an alternative feature serving the same, equivalent, or similar purpose. Thus, unless expressly stated otherwise, each feature disclosed is only an example of a generic series of equivalent or similar features.

From the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

EQUIVALENTS

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be examples only and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments can be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of" will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of" "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

What is claimed is:

1. A method for purifying extracellular vesicles (EVs) from a sample comprising EVs, high density lipoprotein (HDL), and lipoprotein particles (LPPs), the method comprising:

contacting the sample comprising the EVs with a size exclusion resin for a time and under conditions sufficient to separate HDL from the EVs;

contacting the sample with a cation exchange resin for a time and under conditions sufficient to bind LPPs; and collecting flow-through comprising the EVs, wherein the flow-through is substantially depleted of HDL and LPPs.

2. The method of claim 1, wherein the sample is contacted with the size exclusion resin and the cation exchange resin at the same time.

3. The method of claim 1, wherein the sample is contacted with the size exclusion resin prior to contacting the cation exchange resin.

4. The method of claim 1, wherein the sample is contacted with the size exclusion resin after contacting the cation exchange resin.

5. The method of claim 1, wherein the size exclusion resin and the cation exchange resin are disposed in different columns.

6. The method of claim 1, wherein the size exclusion resin and the cation exchange resin are disposed in a single column.

7. The method of claim 1, wherein the size exclusion resin contacts the cation exchange resin.

8. The method of claim 1, wherein the size exclusion resin has a pore size of 40 to 70 nm.

9. The method of claim 1, wherein the cation exchange resin comprises sulfoisobutyl ligands.

10. The method of claim 6, further comprising a membrane disposed inside the column.

11. The method of claim 10, wherein the membrane is a nylon membrane.

12. The method of claim 10, wherein the membrane has a pore size of 2 to 50 µm.

13. The method of claim 10, wherein the membrane has a thickness of 0.1 to 10 mm.

14. The method of claim 1, further comprising contacting a buffer with the size exclusion resin, the cation exchange resin, or both.

15. The method of claim 1, wherein the sample is plasma, serum, or cell culture supernatant.

16. The method of claim 1, further comprising centrifuging the sample prior to contacting the sample with the size exclusion resin.

17. The method of claim 1, wherein the volume of the sample is between 0.1 to 5 mL.

18. The method of claim 1, further comprising concentrating the EVs in the flow-through using ultrafiltration.

* * * * *